(12) United States Patent
Cohen et al.

(10) Patent No.: US 11,460,157 B2
(45) Date of Patent: Oct. 4, 2022

(54) LIGHTING ASSEMBLY JUNCTION BOX FOR ADJUSTABLE CEILING INSTALLATION

(71) Applicant: Brandon Cohen, Los Angeles, CA (US)

(72) Inventors: Brandon Cohen, Los Angeles, CA (US); Sung Jung, Culver City, CA (US)

(*) Notice: Subject to any disclaimer, the term of this patent is extended or adjusted under 35 U.S.C. 154(b) by 421 days.

(21) Appl. No.: 16/790,345

(22) Filed: Feb. 13, 2020

(65) Prior Publication Data

US 2020/0182420 A1 Jun. 11, 2020

Related U.S. Application Data

(63) Continuation-in-part of application No. 16/417,546, filed on May 20, 2019, now Pat. No. 10,876,721, which is a continuation of application No. 15/464,009, filed on Mar. 20, 2017, now Pat. No. 10,295,163, which is a continuation of application
(Continued)

(51) Int. Cl.
| | |
|---|---|
| *H02G 3/08* | (2006.01) |
| *F21S 8/02* | (2006.01) |
| *H02G 3/20* | (2006.01) |
| *F21V 21/04* | (2006.01) |
| *H02G 3/12* | (2006.01) |
| *F21Y 115/10* | (2016.01) |

(52) U.S. Cl.
CPC ............ *F21S 8/026* (2013.01); *F21V 21/048* (2013.01); *H02G 3/125* (2013.01); *H02G 3/20* (2013.01); *F21Y 2115/10* (2016.08)

(58) Field of Classification Search
CPC .......... H02G 3/08; H02G 3/081; H02G 3/083; H02G 3/12; H02G 3/121; H02G 3/123; H02G 3/125; H02G 3/126; H02G 3/10; H05K 5/00; H05K 5/02; H05K 5/0204; H05K 5/0217; F21V 21/04; F21V 21/042; F21V 21/048
USPC ....... 174/480, 481, 50, 53, 57, 58, 535, 542, 174/560, 559, 54, 61, 63; 220/3.2–3.9, 220/4.02; 248/906, 343, 317, 342
See application file for complete search history.

(56) References Cited

U.S. PATENT DOCUMENTS

| | | | | |
|---|---|---|---|---|
| 1,982,957 A | * | 12/1934 | Knell ............... | H02G 3/126 |
| | | | | 220/3.9 |
| 2,023,083 A | * | 12/1935 | Knell ............... | H02G 3/126 |
| | | | | 220/3.9 |

(Continued)

*Primary Examiner* — Angel R Estrada
(74) *Attorney, Agent, or Firm* — Eric Kelly

(57) ABSTRACT

A lighting junction box assembly includes a lighting junction box housing having a body with a partially cylindrical sidewall, a closed end, and a circular opening opposite the closed end, and flat inset facets with knock-out holes formed on the sidewall. A pair of bracket assemblies attaches the lighting junction box housing in a vertically adjustable position onto hanger bars fixed between ceiling joists. The adjustable vertical position provides for use and mounting in ceilings of various thicknesses. The bracket assemblies provide the ability to adjust the vertical position of the lighting junction box housing during installation by a simple fastener inside the junction box which may be tightened without the use of tools. This capability is accomplished by the use of a carriage bolt which may be vertically positioned in a slot in the bracket.

20 Claims, 26 Drawing Sheets

Related U.S. Application Data

No. 29/597,785, filed on Mar. 20, 2017, now Pat. No. Des. 892,069.

(56) References Cited

U.S. PATENT DOCUMENTS

| | | | | |
|---|---|---|---|---|
| 2,316,389 A * | 4/1943 | Atkinson | ............... | H02G 3/126 |
| | | | | 220/3.9 |
| 6,889,943 B2 * | 5/2005 | Dinh | ..................... | F04D 29/601 |
| | | | | 248/57 |
| 6,967,284 B1 * | 11/2005 | Gretz | ..................... | H02G 3/125 |
| | | | | 174/57 |
| 7,628,286 B2 * | 12/2009 | Lalancette | ............. | H02G 3/126 |
| | | | | 220/3.9 |
| 7,654,495 B2 * | 2/2010 | Adrian | .................. | F04D 25/088 |
| | | | | 248/906 |
| 8,785,774 B1 * | 7/2014 | Gretz | ..................... | H02G 3/126 |
| | | | | 174/57 |
| 8,889,984 B2 * | 11/2014 | Korcz | ..................... | F16M 13/02 |
| | | | | 174/40 R |
| 11,159,004 B2 * | 10/2021 | Cohen | ....................... | H02G 3/12 |
| 11,255,497 B2 * | 2/2022 | Danesh | ................ | F21V 23/003 |

* cited by examiner

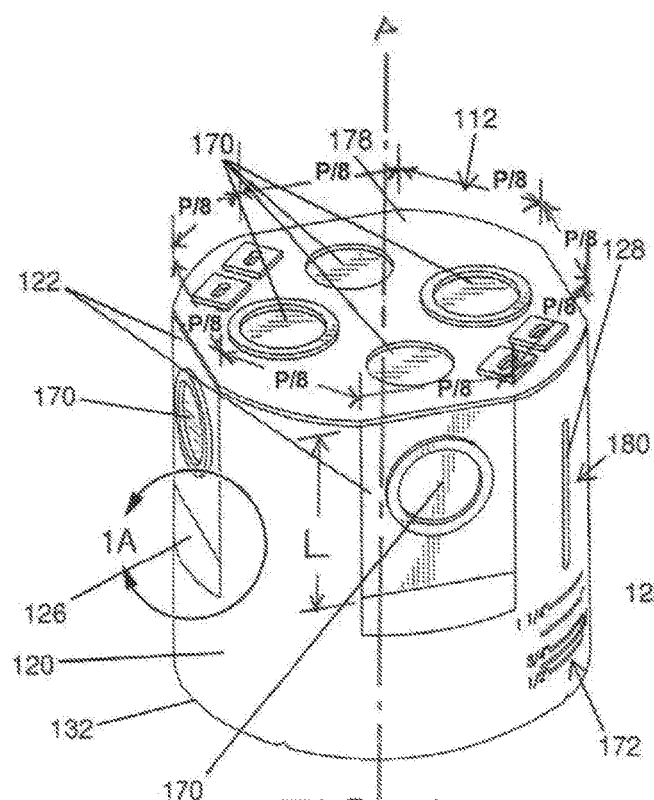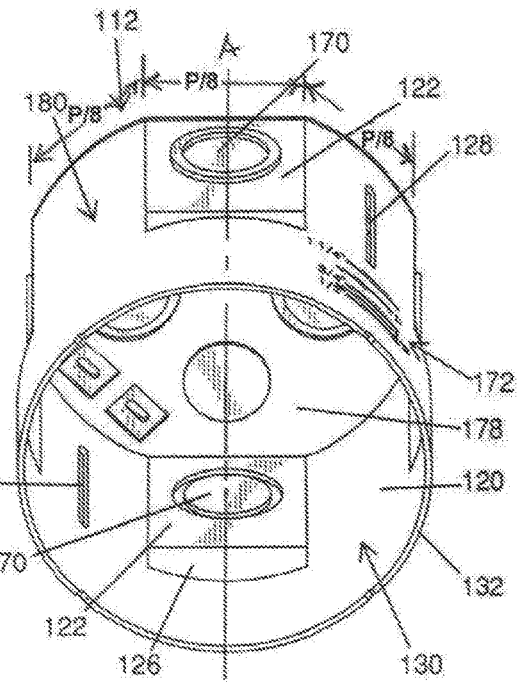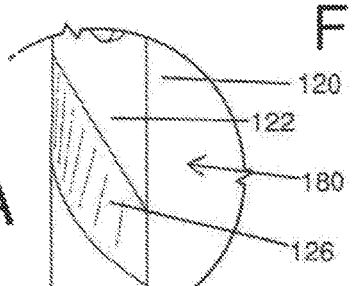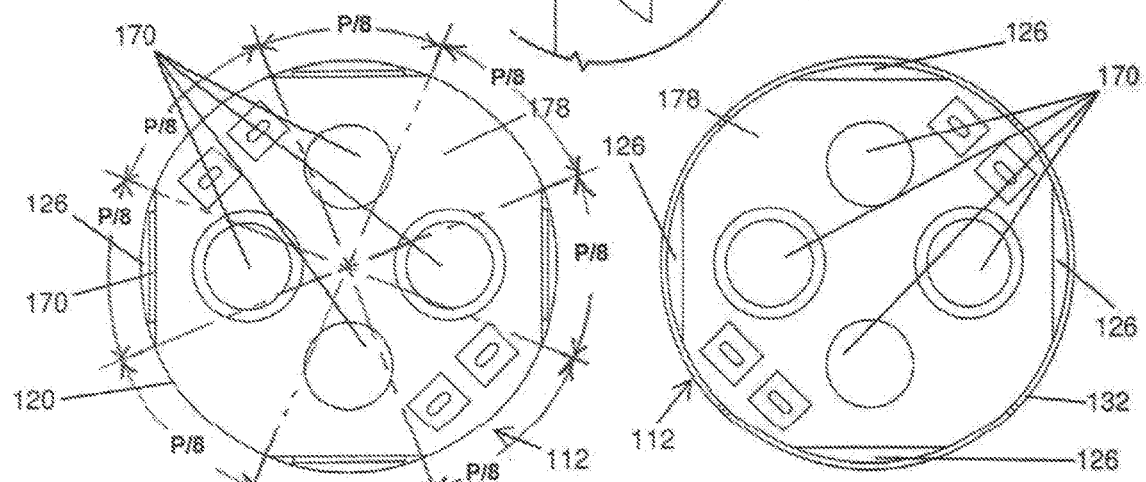

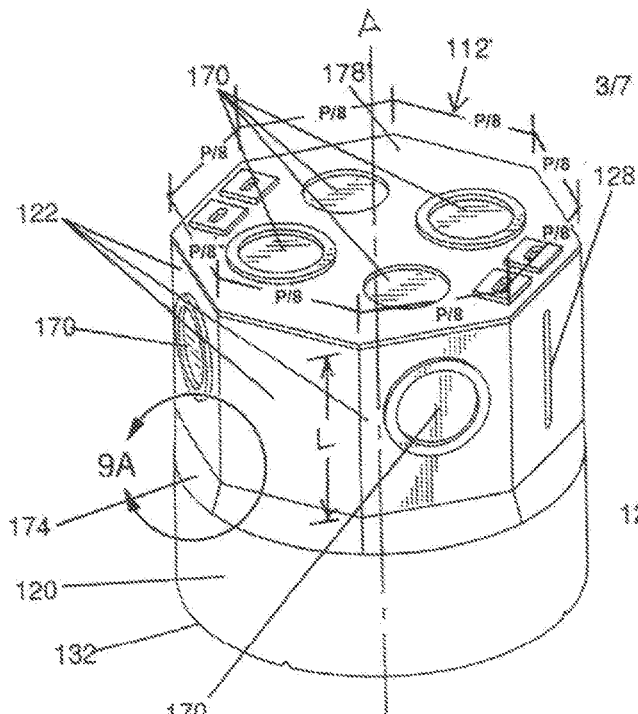
FIG. 9
FIG. 9A
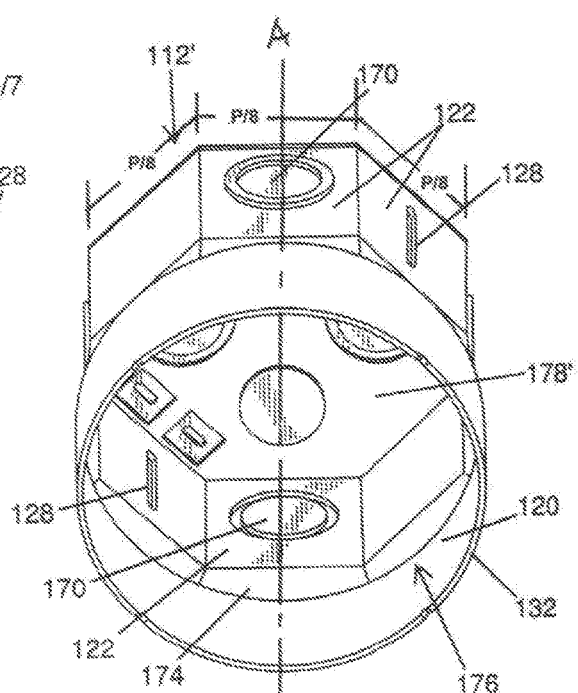
FIG. 10
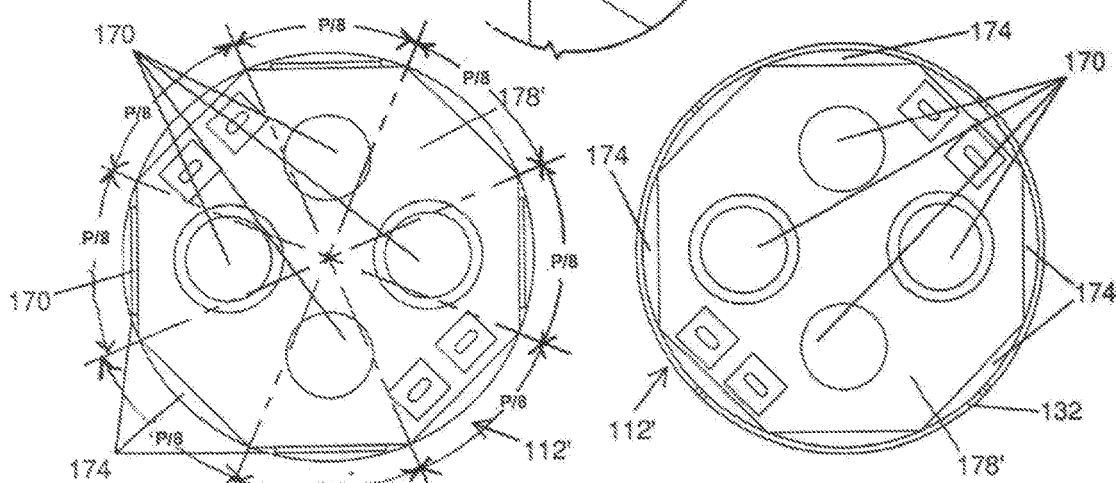
FIG. 11
FIG. 12

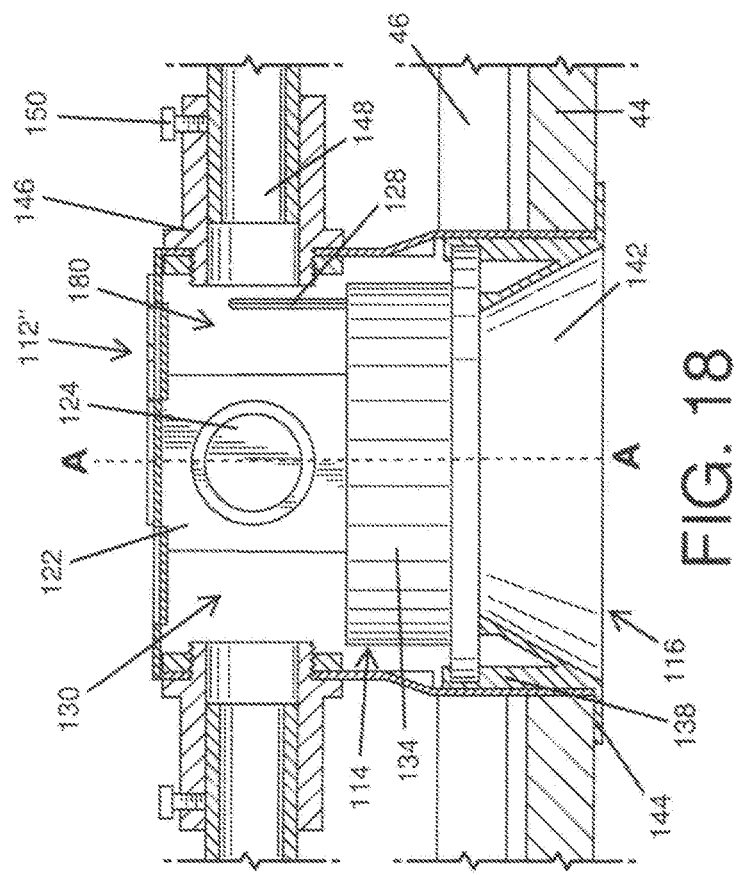
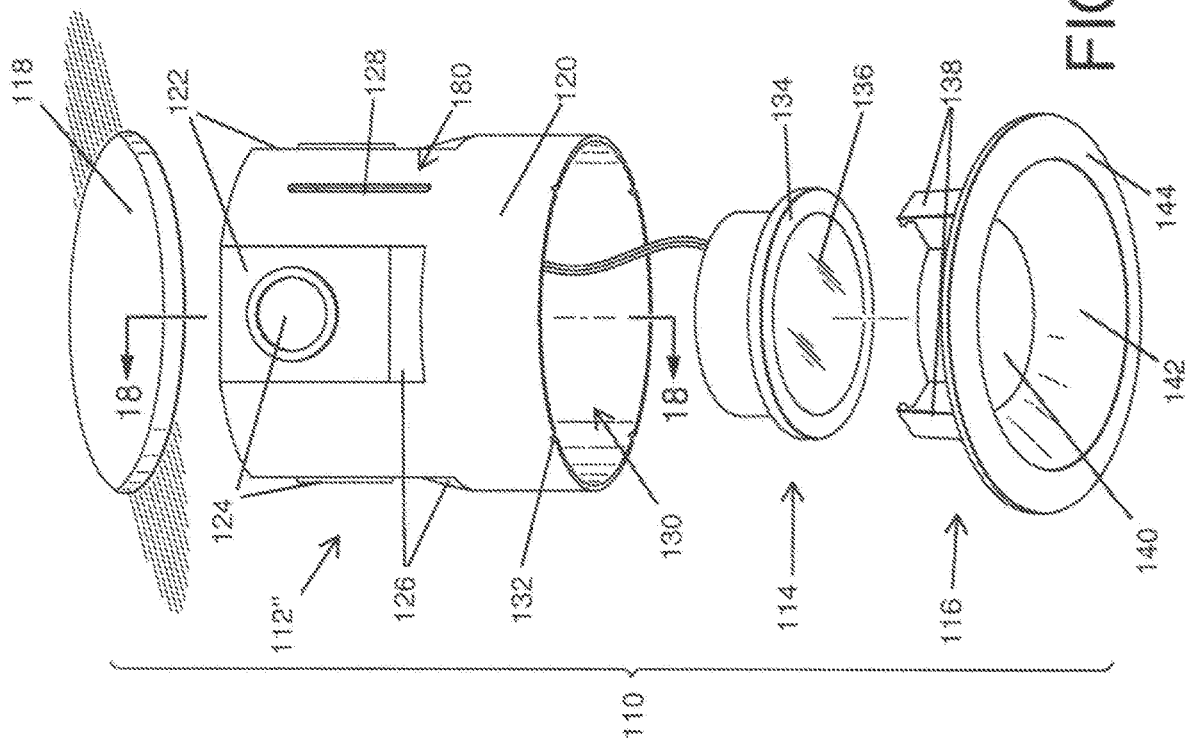
FIG. 17
FIG. 18

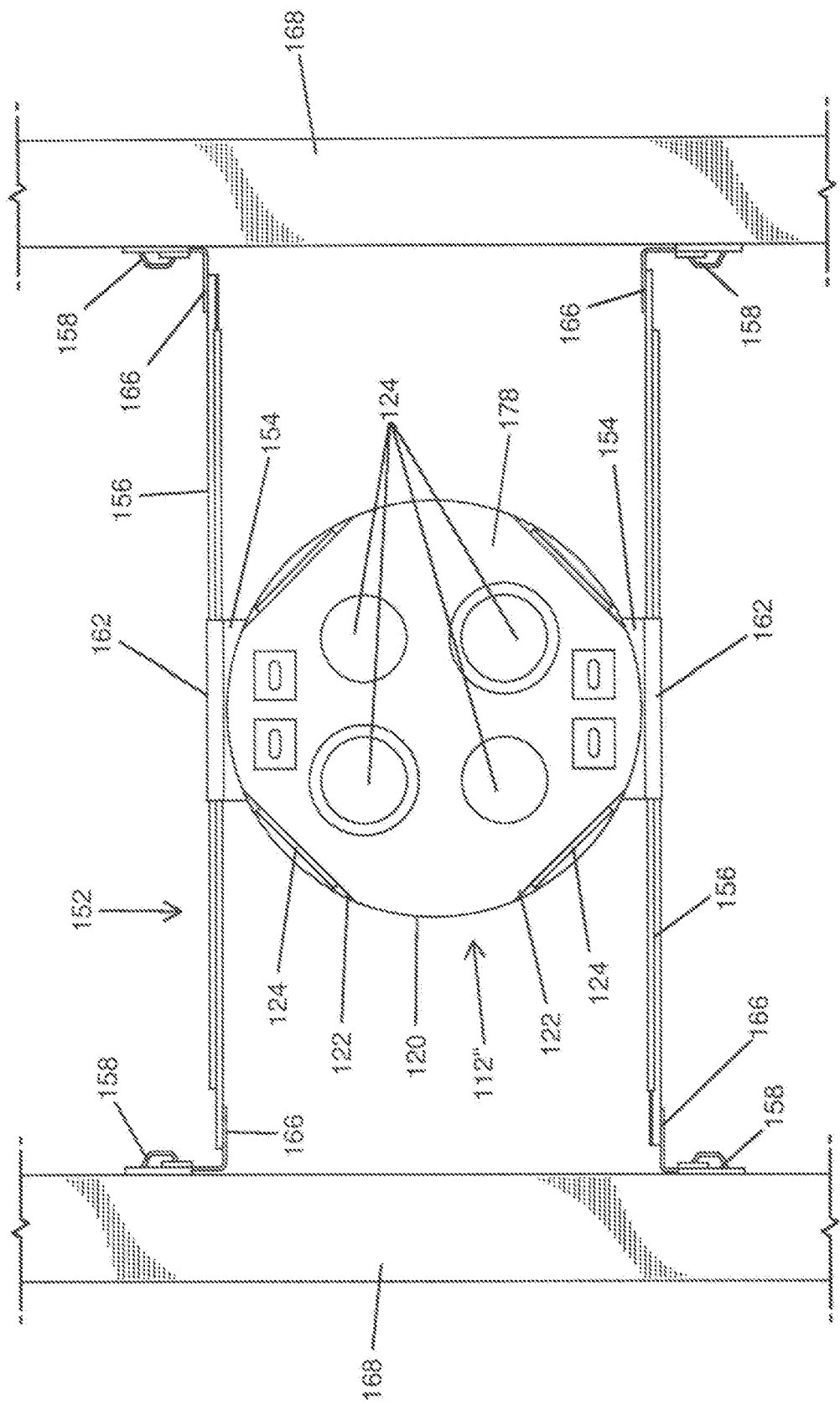

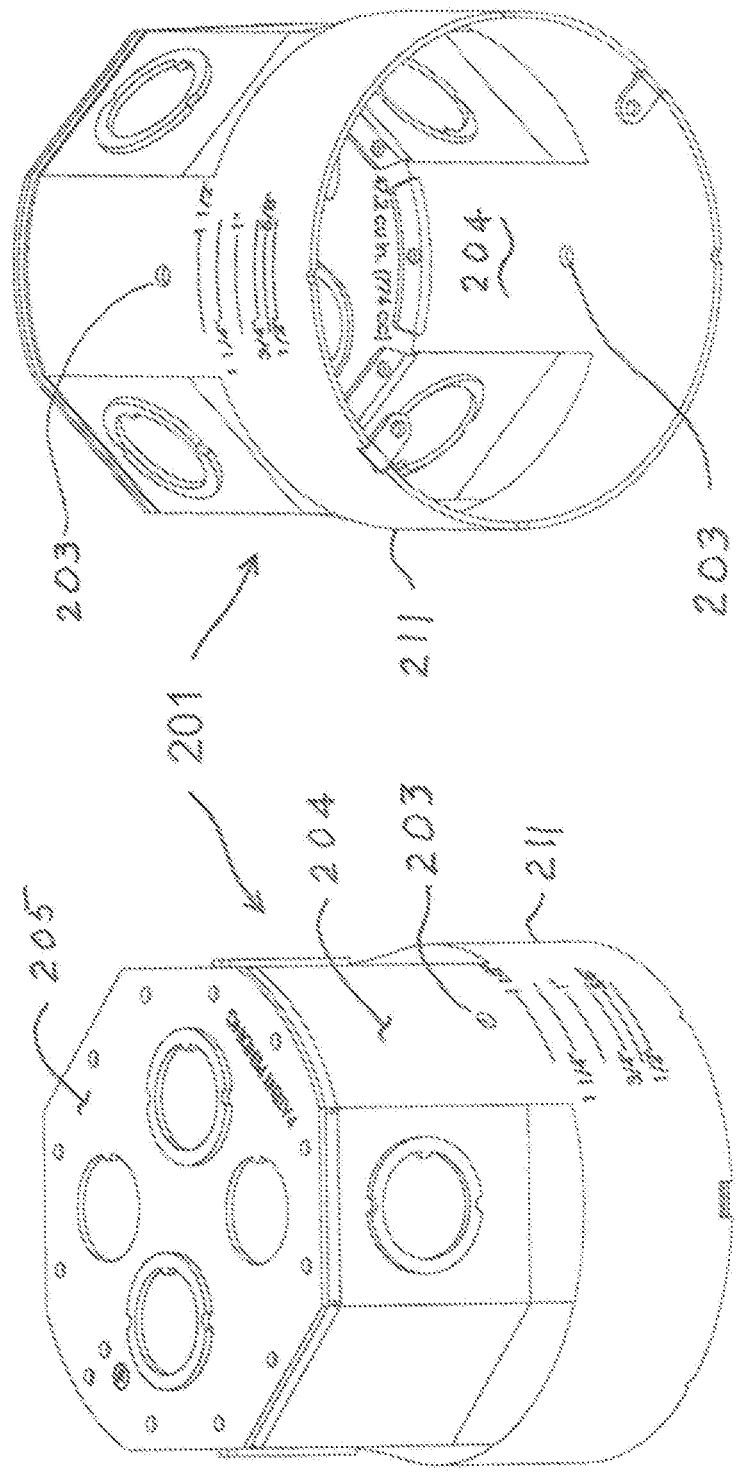

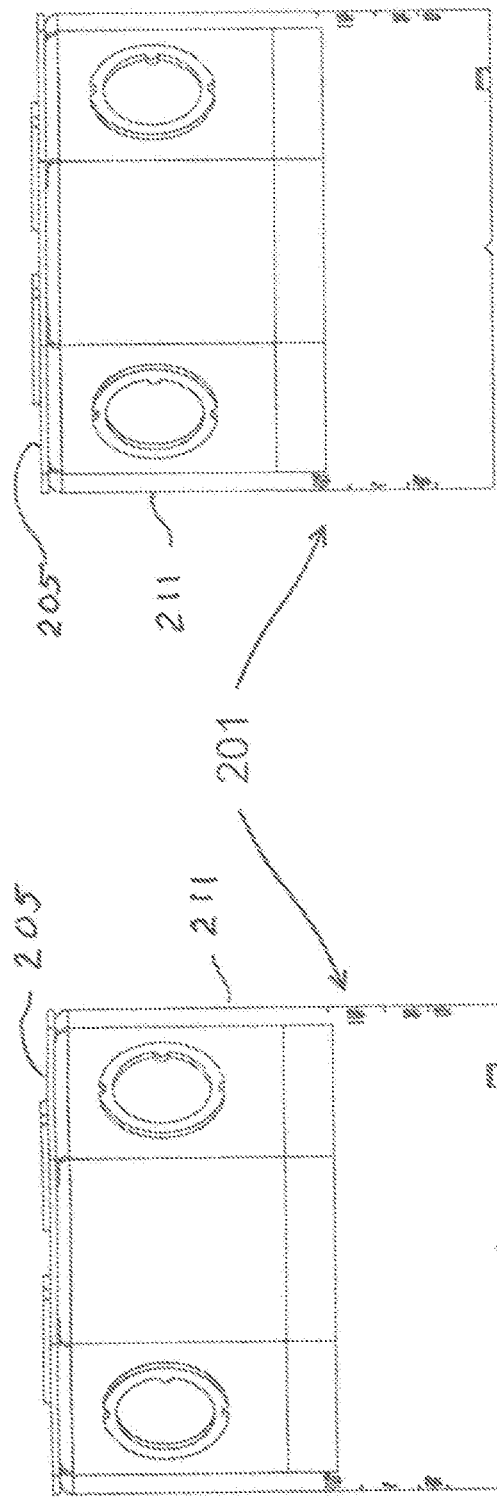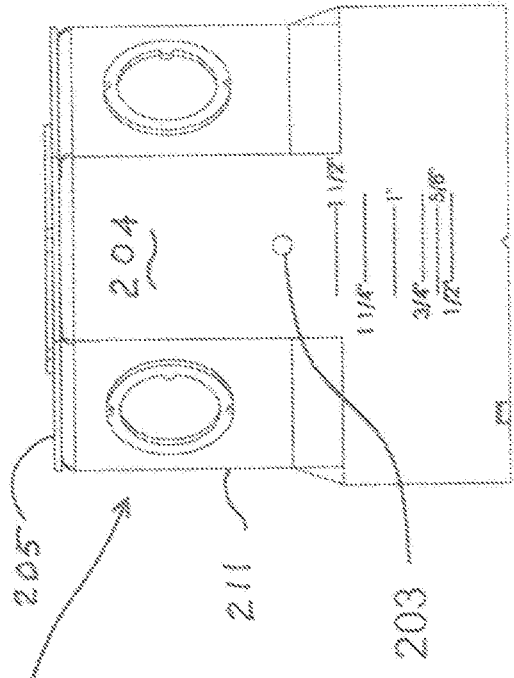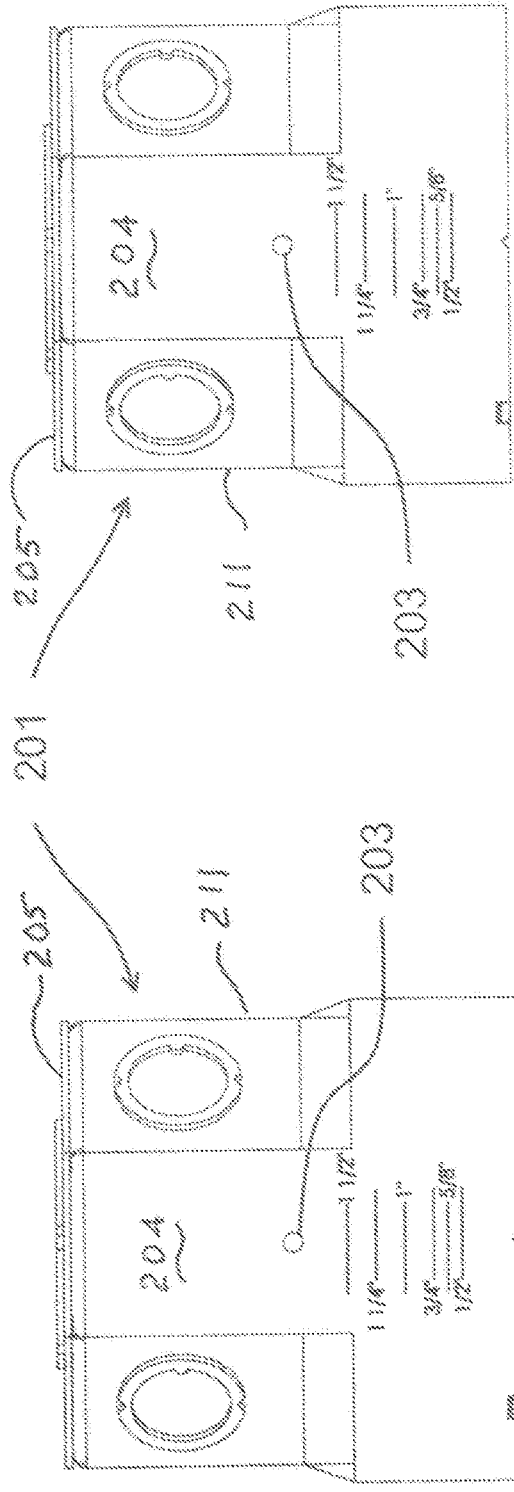

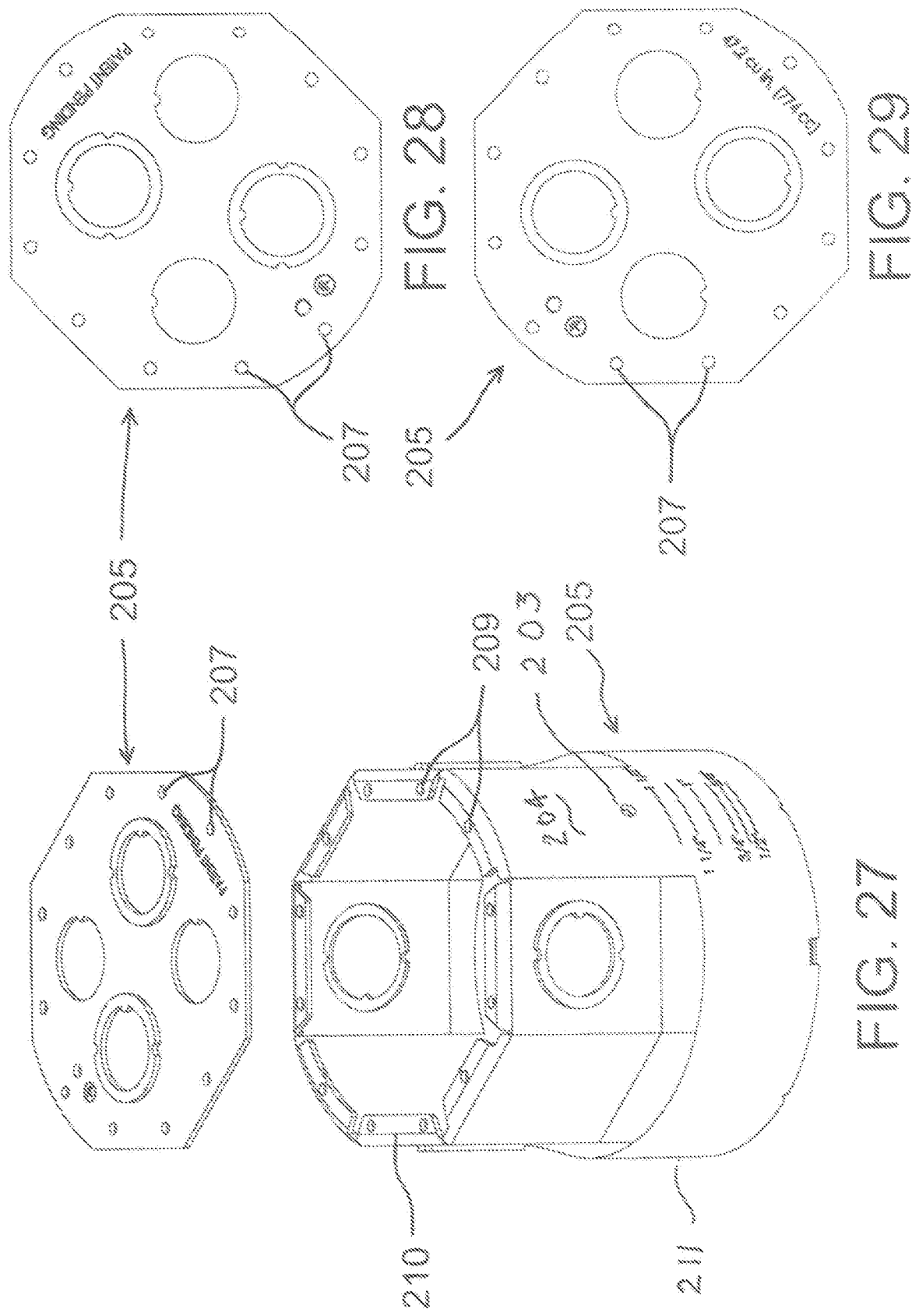

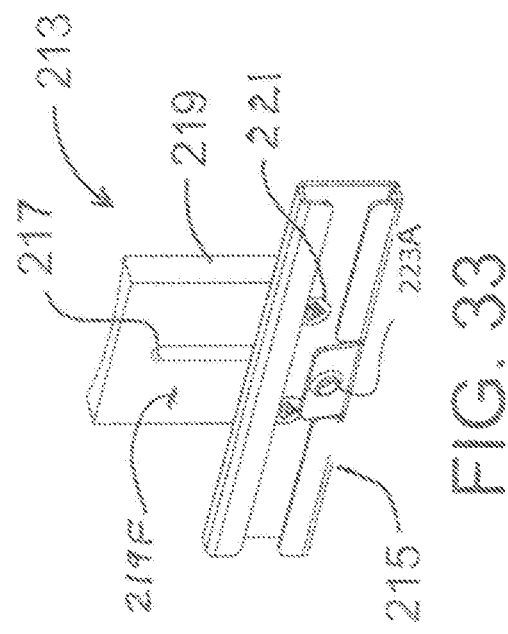
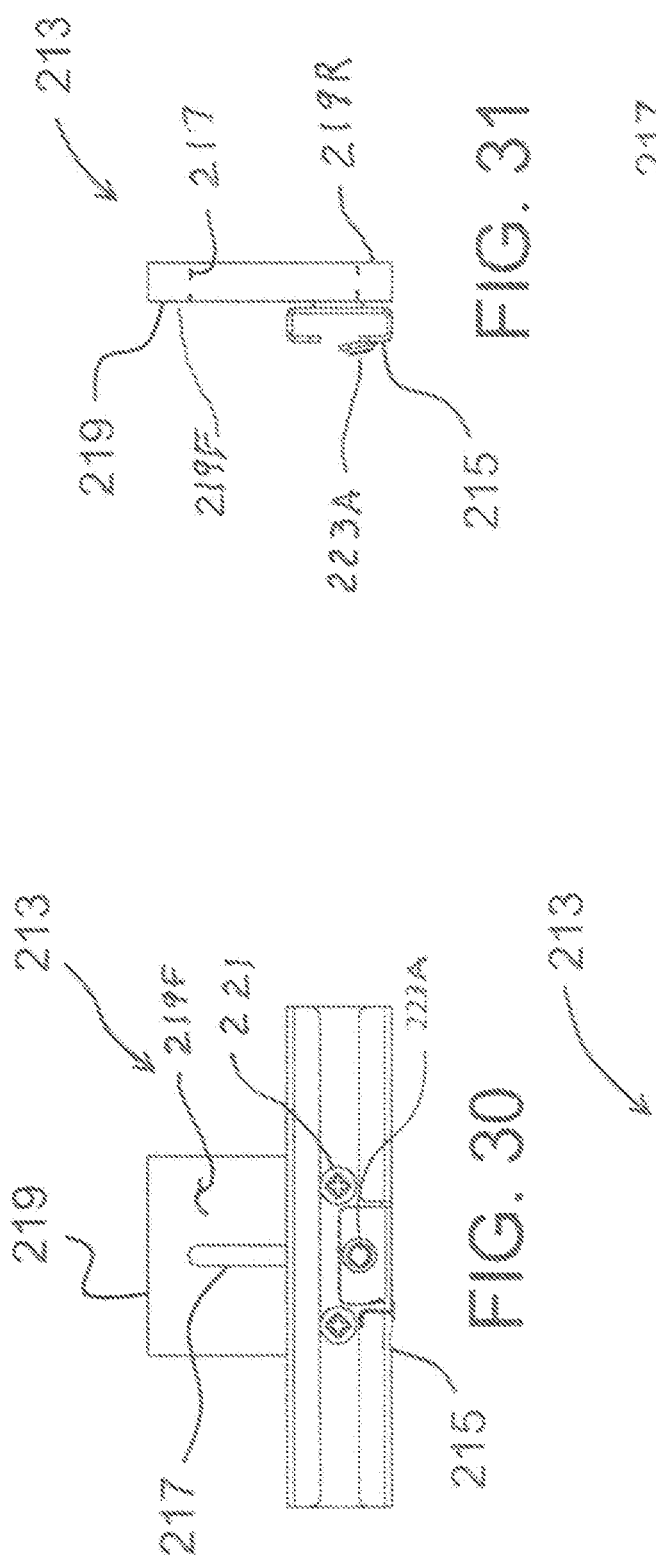

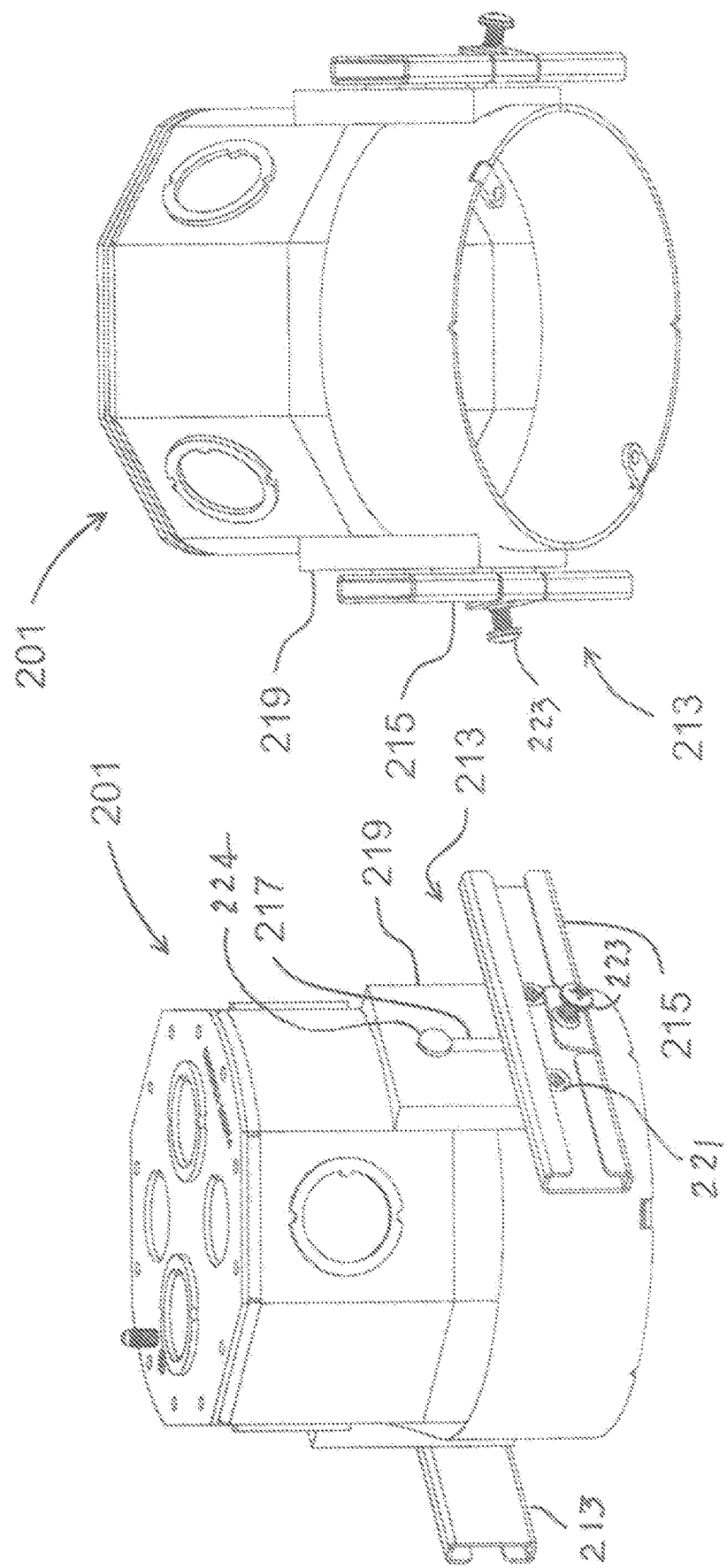

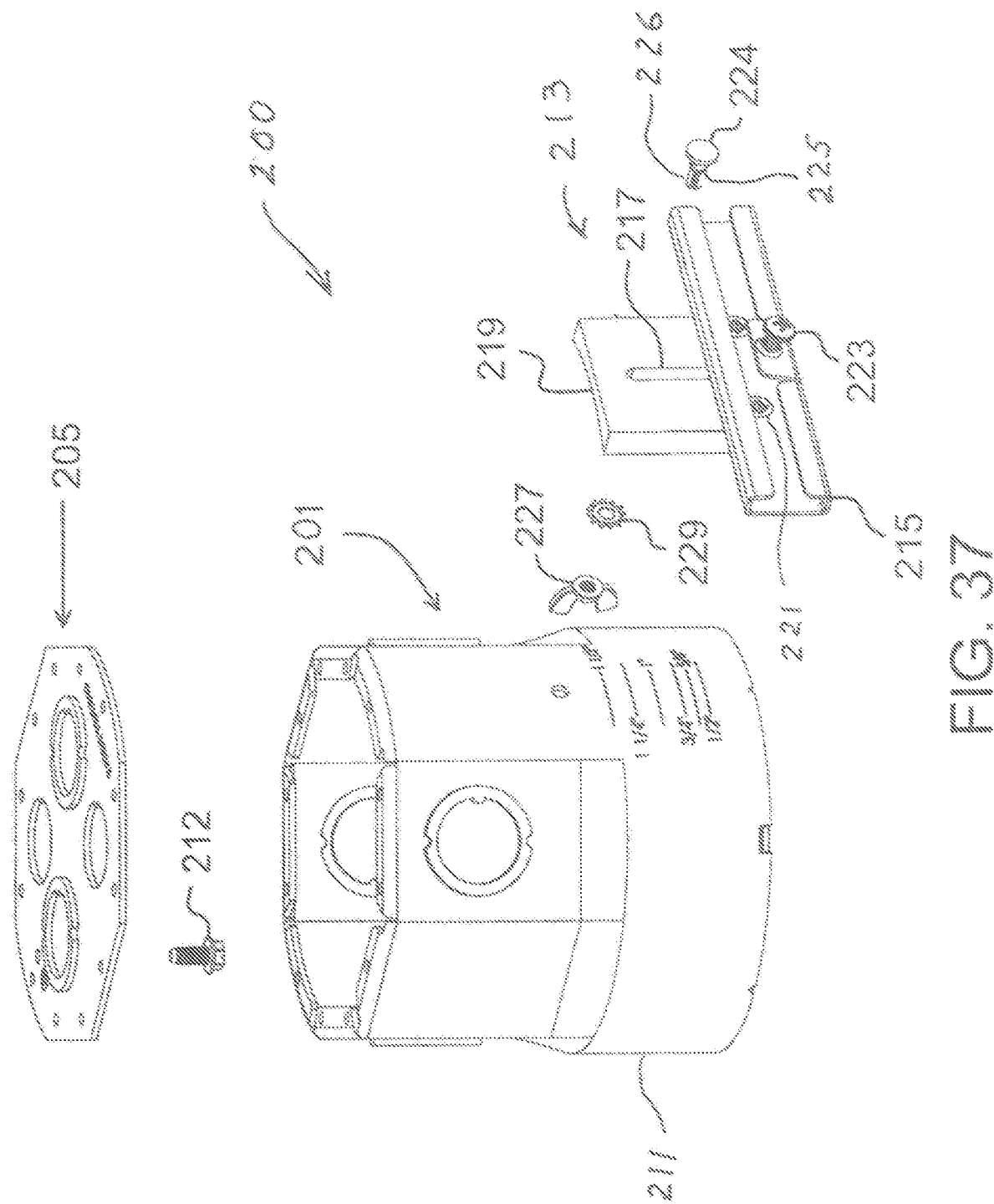

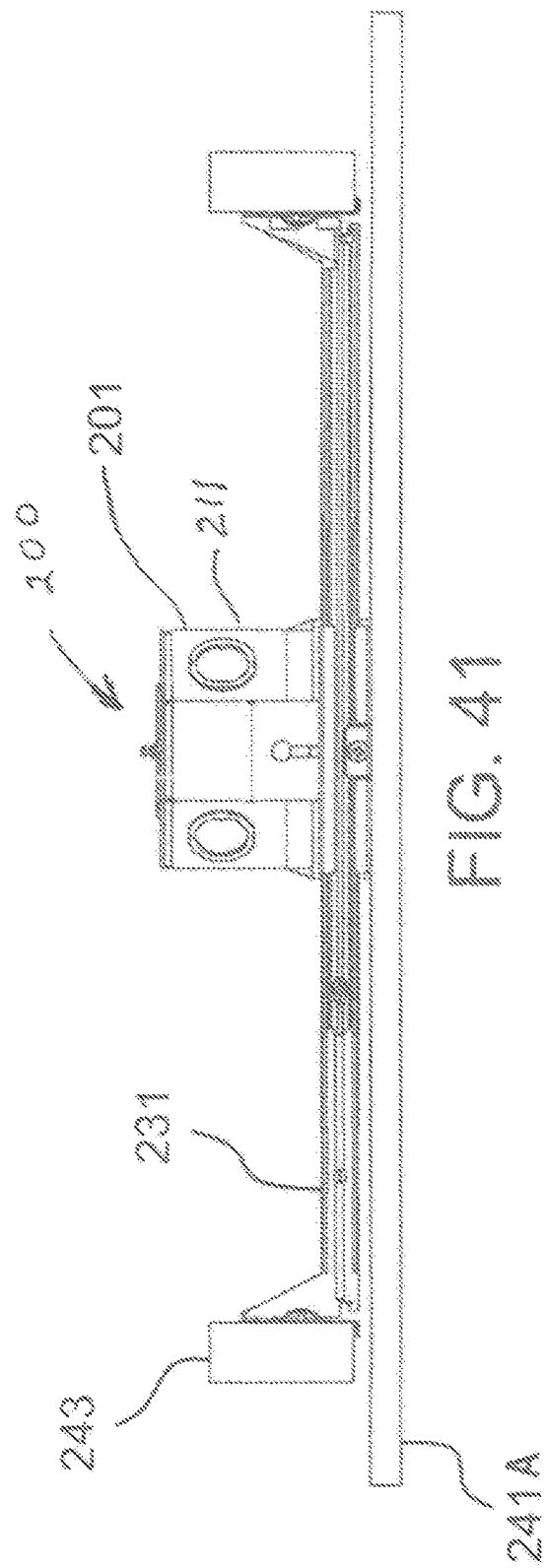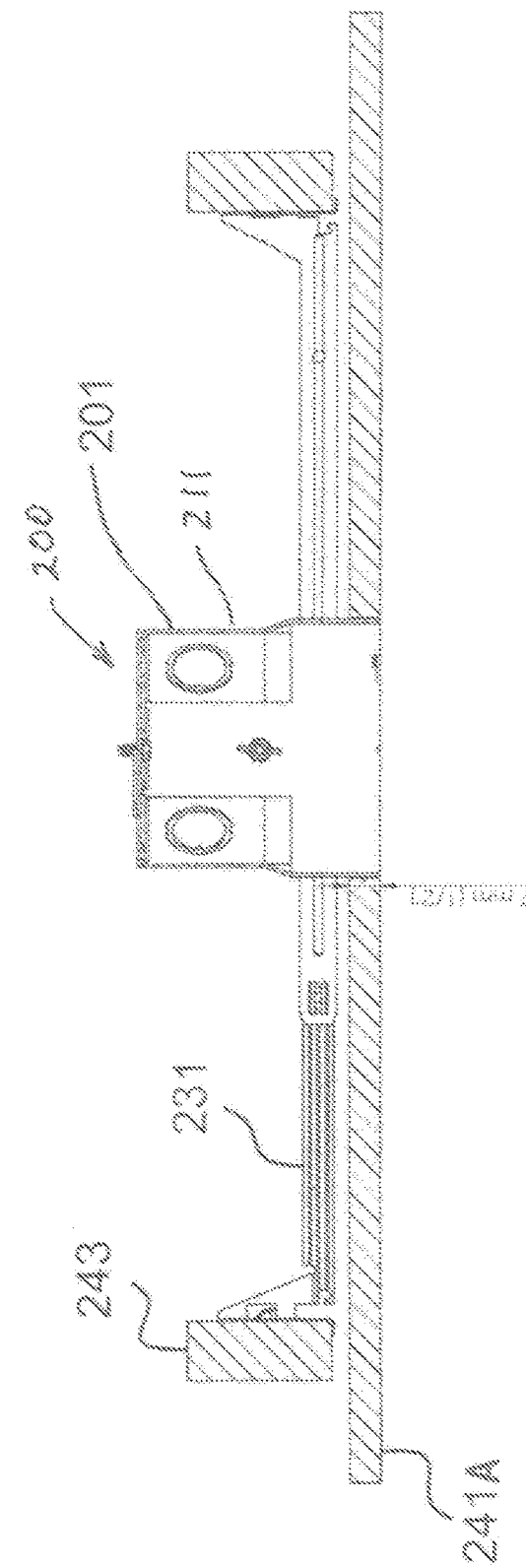

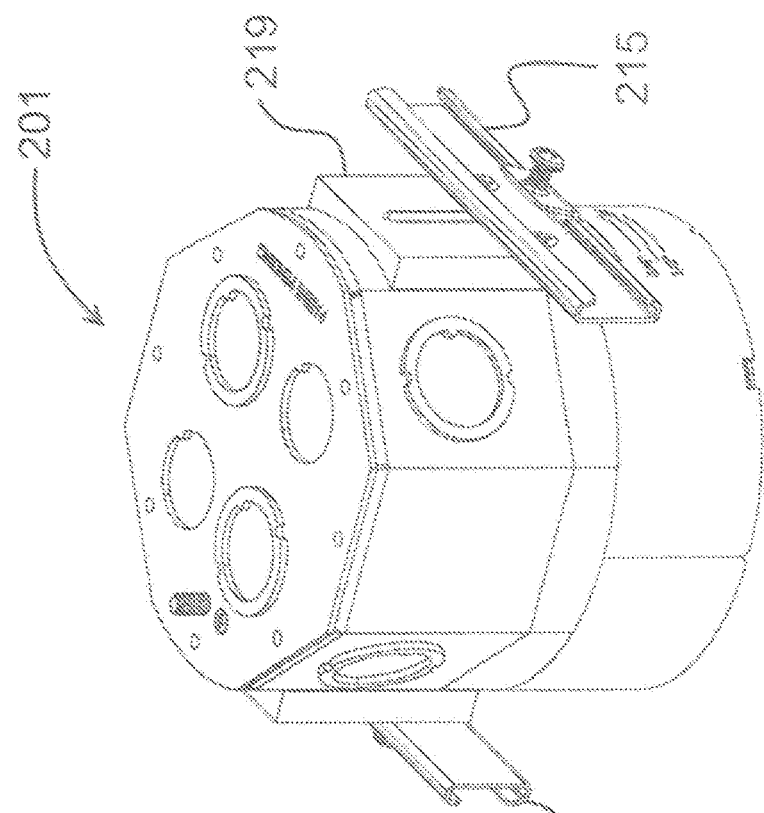
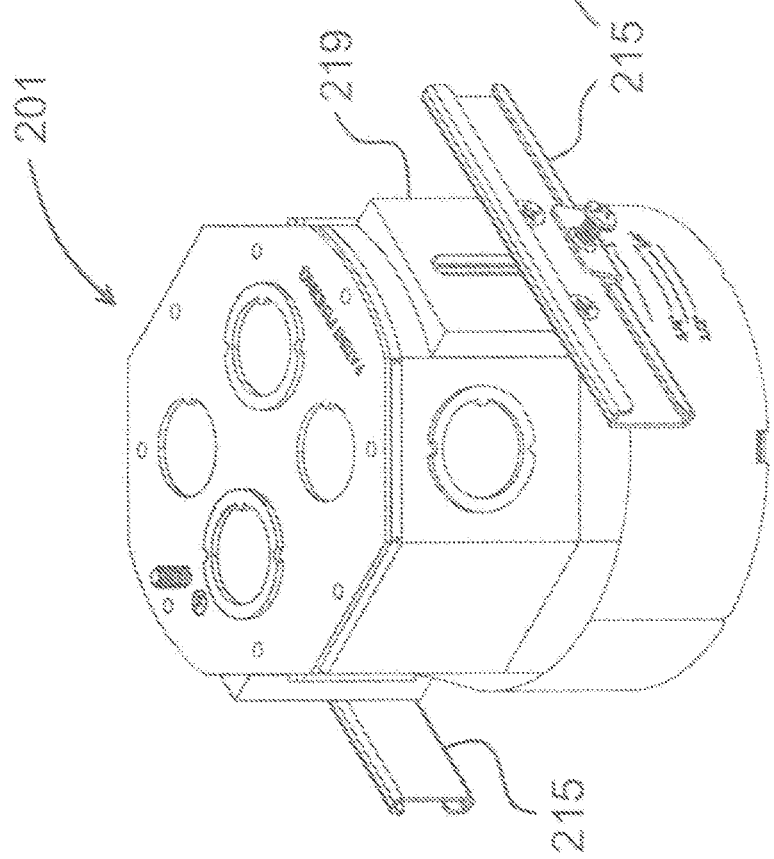

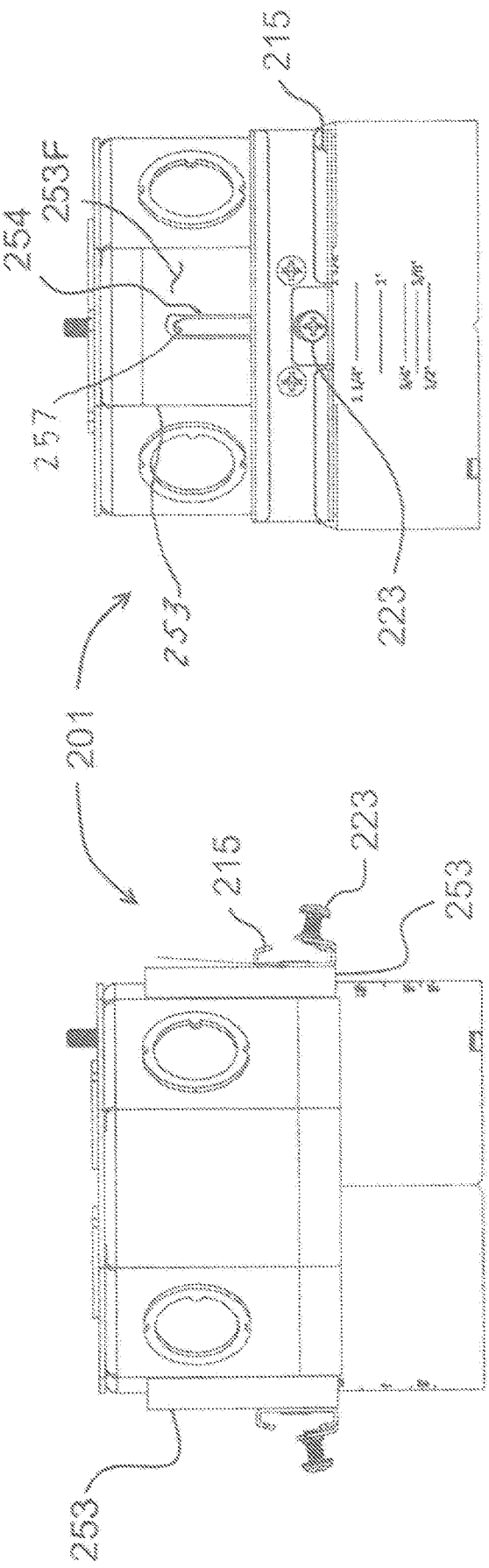

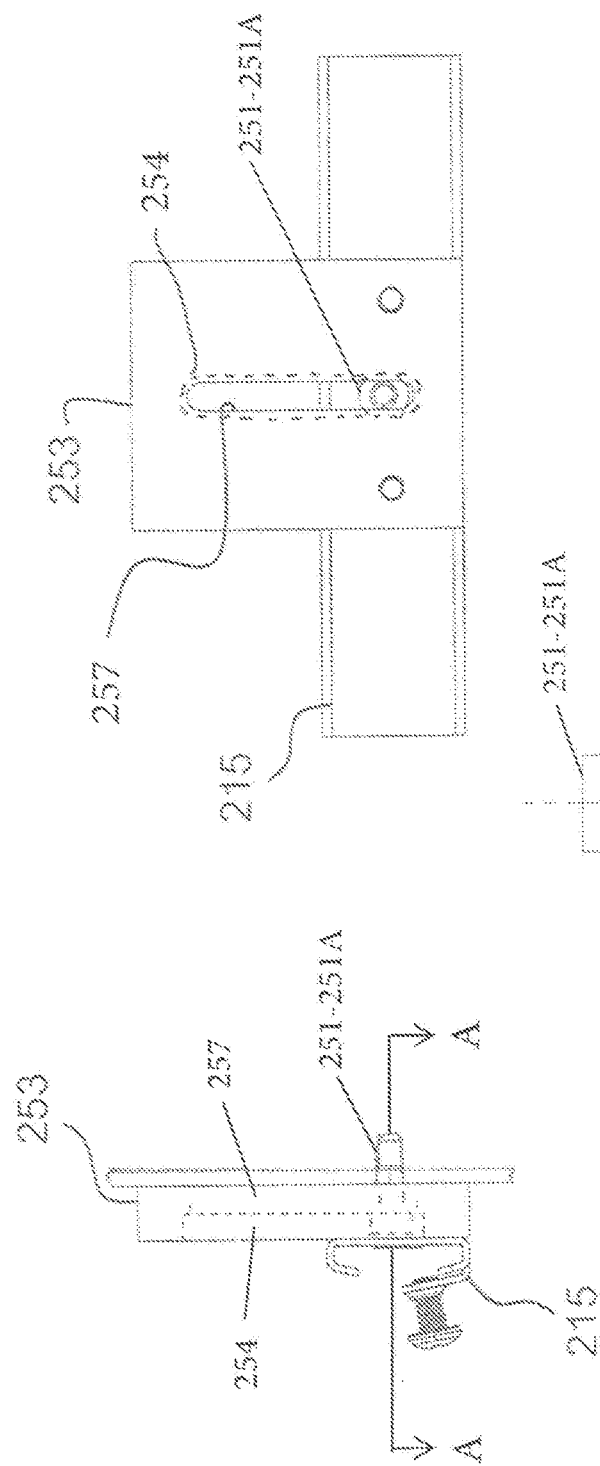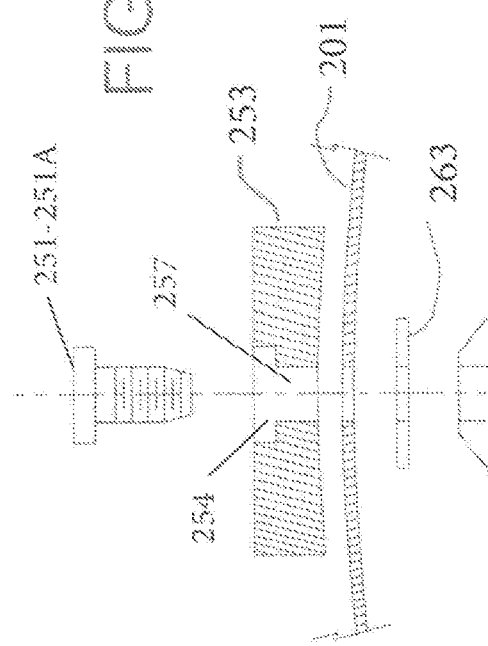

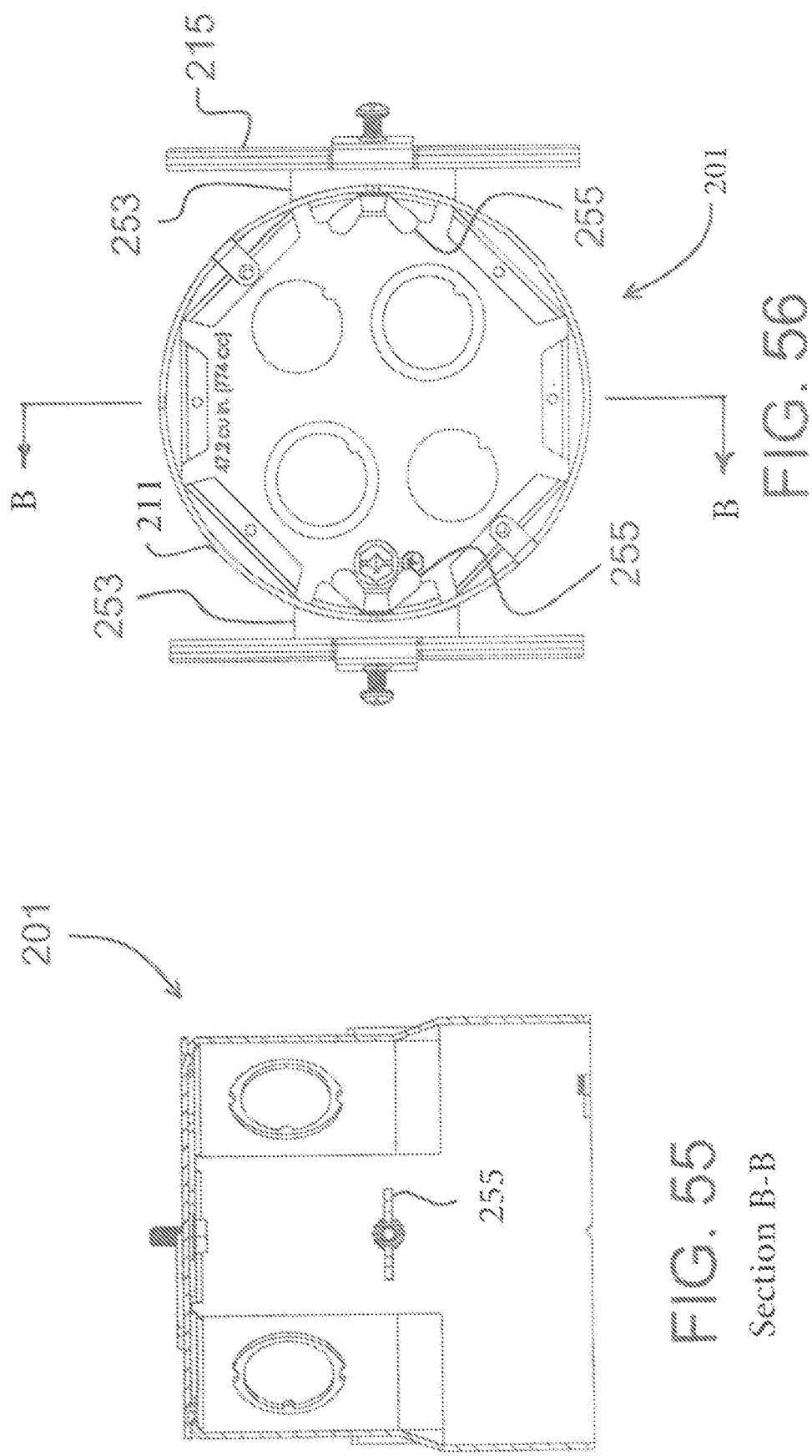

Section C-C

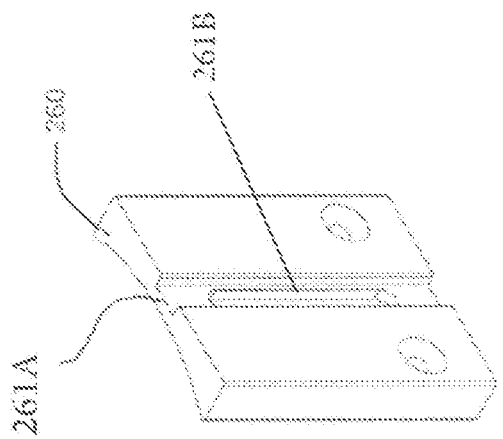
FIG. 61
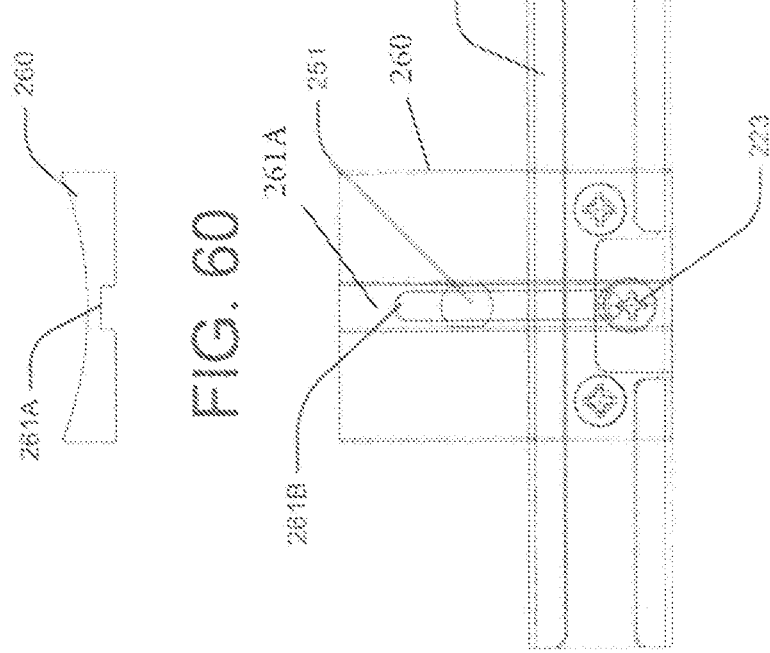
FIG. 60
FIG. 62

LIGHTING ASSEMBLY JUNCTION BOX FOR ADJUSTABLE CEILING INSTALLATION

REFERENCE TO RELATED APPLICATIONS

This application is a continuation-in-part of U.S. patent application Ser. No. 16/417,546 for a Lighting Assembly with Junction Box Support, filed on May 20, 2019, which is a continuation of U.S. patent application Ser. No. 15/464,009 for a Lighting Assembly with Junction Box Support, filed on Mar. 20, 2017, both of which are incorporated herein in their entirety.

FIELD OF THE INVENTION

The invention relates to electrical junction lighting boxes in particular of the type for recessed ceiling lights.

BACKGROUND

The manufacture and installation of recessed lighting is complicated by the required adherence to building codes and regulations. In the past, the combination of a recessed ceiling lighting housing—or "can"—and a separate recessed fire-rated drywall box was required when installing an overhead light fixture in order to create a space between the can and surrounding insulation. The purpose of the space is to prevent fire hazard such as in the event of an electrical failure. The can held the lighting fixture, while the surrounding drywall box provided the required space to prevent fire hazards in the event of an electrical failure. This combination was necessarily accompanied by at least one separate junction box, in which through-branch wiring connections were routed for each overhead downlight connected in the circuit.

Recently, compact junction lighting boxes have been developed that retain the combination of a fire-rated recessed lighting fixture, while also allowing the wiring connections afforded by traditionally-separate junction boxes. This combination junction lighting box provides both the lighting housing and the electrical junction box requirements in a single unit. Importantly, the new combination junction lighting boxes provide fire-rated protection, without the need for the creation of a separate fire-rated drywall cavity surrounding the can that houses the lighting element. When used in conjunction with light emitting diode (LED) lighting, in which heat production and overall lighting module size are reduced, the new combination box provides a multitude of advantages over traditional downlight fixtures and circuits.

BRIEF DESCRIPTION OF THE DRAWINGS

The embodiments of the invention are illustrated by way of example and not by way of limitation, in which like references indicate similar elements. It should be noted that references to "an' or "one" embodiment of the invention in this disclosure are not necessarily to the same embodiment.

FIG. 1 shows a top perspective view of a partially-faceted junction box, according to one embodiment.

FIG. 1A shows a close-up perspective view of the selection 1A shown in FIG. 1.

FIG. 2 shows a bottom perspective view of the box of FIG. 1.

FIG. 3 shows a top view of the box of FIG. 1.

FIG. 4 shows a bottom view of the box of FIG. 1.

FIG. 9 shows a perspective view of a faceted junction box, according to one embodiment.

FIG. 9A shows a close-up perspective view of the selection 9A shown in FIG. 9.

FIG. 10 shows a bottom perspective view of the box of FIG. 9.

FIG. 11 shows a top view of the box of FIG. 9.

FIG. 12 shows a bottom view of the box of FIG. 9.

FIG. 17 shows an exploded view of a junction lighting box formed from a partially-faceted junction box, LED light source, and exterior fixture, according to one embodiment.

FIG. 18 shows a cutaway side view of an assembled and installed junction lighting box of FIG. 17, according to one embodiment.

FIG. 20 shows a top view of the junction box and adjustable mounting assembly of FIG. 19.

FIG. 21 shows a top perspective view of a partially-faceted junction box and lid, according to an alternative embodiment.

FIG. 22 shows a bottom perspective view of the box and lid from FIG. 21.

FIG. 23 shows a front-left side view of the box and lid looking from a point at the left-front of FIG. 21.

FIG. 24 shows a back side view of the box and lid looking from a point opposite to the view of FIG. 23 of FIG. 21.

FIG. 25 shows a front-right side view of the box and lid looking from a point at the right-front of FIG. 21

FIG. 26 shows a back side view of the box and lid looking from a point opposite to the view of FIG. 25 of FIG. 21

FIG. 27 shows a top perspective exploded view of the box from FIG. 21 with the lid lifted off to see the underlying structure for attachment of the lid.

FIG. 28 shows a top view of a lid for the box from FIG. 21 with the pryouts removed from the lid.

FIG. 29 shows a 90 degree rotated top view of a lid for the box from FIG. 21 with the pryouts removed from the lid.

FIG. 30 shows a front view of the hanger bar bracket assembly according to the alternative embodiment.

FIG. 31 shows a side view of the hanger bar bracket assembly according to the alternative embodiment.

FIG. 32 shows a back view of the hanger bar bracket assembly according to the alternative embodiment.

FIG. 33 shows a front perspective view of the hanger bar bracket assembly according to the alternative embodiment.

FIG. 35 shows a top perspective view of the box and lid assembly from FIG. 21 with a pair of hanger bar bracket assemblies from FIG. 30 attached.

FIG. 36 shows a bottom perspective view of the box and lid assembly from FIG. 21 with a pair of hanger bar bracket assemblies from FIG. 30 attached.

FIG. 37 shows a front-top exploded view of the lid and box assembly from FIG. 21 and a hanger bar bracket assembly from FIG. 30.

FIG. 41 shows a side view of the box and lid assembly from FIG. 21 with a pair of attached hanger bar bracket assemblies from FIG. 30 connected to a pair of hanger bars mounted between ceiling joists, with the box configured for minimum ceiling thickness.

FIG. 42 shows a side cross-section view of the box and lid assembly from FIG. 21 with a pair of attached hanger bar bracket assemblies from FIG. 30 connected to a pair of hanger bars mounted between ceiling joists, with the box configured for minimum ceiling thickness.

FIG. 45 shows a top perspective view of the box and lid assembly from FIG. 21 with a pair of attached hanger bar bracket assemblies from FIG. 30 and with the hanger bar and the embodiment that has in the height slide plate a slot and a groove also called a T-slot, that hides the bolt head in the groove.

FIG. 46 shows a top perspective view of the box and lid assembly from FIG. 21 with a pair of attached hanger bar bracket assemblies from FIG. 30 also showing the slot and groove height slide plate embodiment.

FIG. 47 shows a side view of the box and lid assembly from FIG. 21 with an alternative embodiment of attached hanger bar bracket assemblies and also showing the height slide plate with the slot and groove embodiment FIG. 48 shows a front view of the box and lid assembly from FIG. 21 with an alternative embodiment of attached hanger bar bracket assemblies from FIG. 47 also showing the height slide plate with the slot and groove embodiment.

FIG. 53 shows a side view of the hanger bar bracket assembly from FIG. 47 as being attached to the lighting junction box.

FIG. 53A Section A-A shows an exploded and partially sectional view through A-A in FIG. 53 with the slot and groove also called the T-bolt and T-slot, shown and the washer and wing nut shown.

FIG. 54 shows a back view of the hanger bar bracket assembly from FIG. 47.

FIG. 55 Section B-B shows cross-section view through B-B of the box and lid assembly in FIG. 56 with an alternative embodiment wingnut fastener.

FIG. 56 shows a bottom view of the box and lid assembly from FIG. 21 with an attached pair of hanger bar bracket assemblies connected by an alternative embodiment wingnut fastener.

FIG. 60 is a top view of an alternative embodiment bracket back piece.

FIG. 61 is a perspective view of an alternative embodiment bracket back piece.

FIG. 62 is a front transparent view of an alternative embodiment bracket back piece.

DETAILED DESCRIPTION

Figure 5:
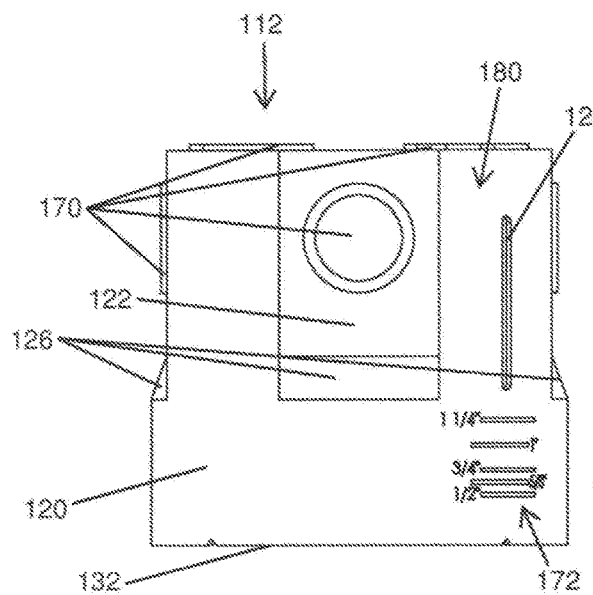
FIG. 5 shows a front view of the box of FIG. 1.
Figure 6:
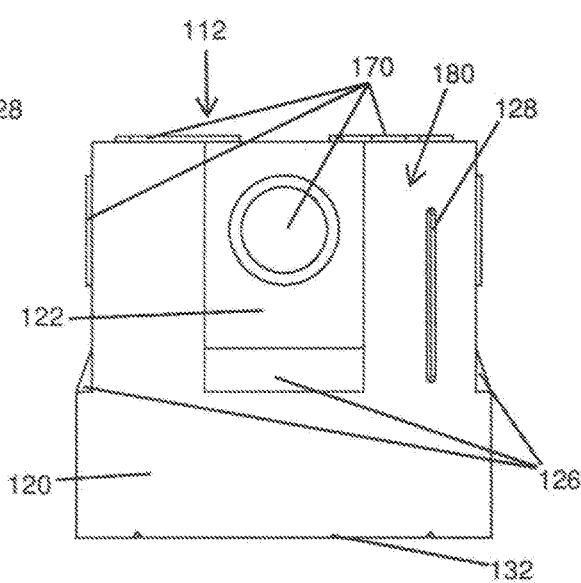
FIG. 6 shows a rear side view of the box of FIG. 1.
Figure 7:
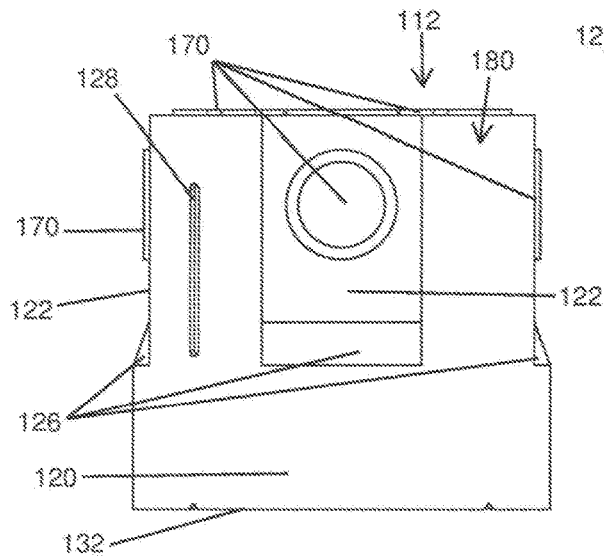
FIG. 7 shows a right side view of the box of FIG. 1.
Figure 8:
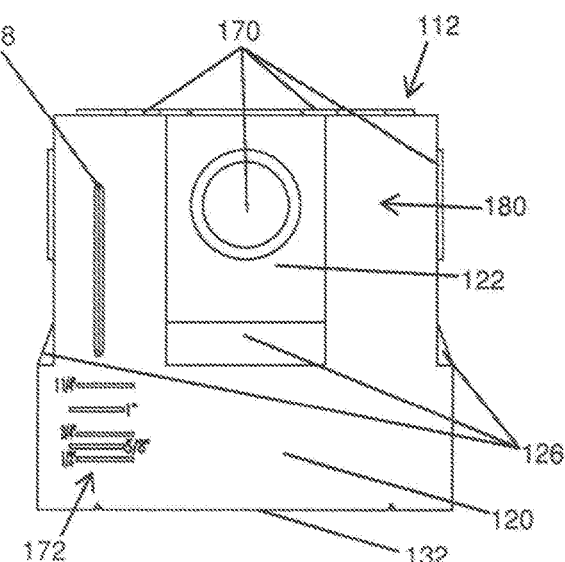
FIG. 8 shows a left side view of the box of FIG. 1.
Figures 13, 14:
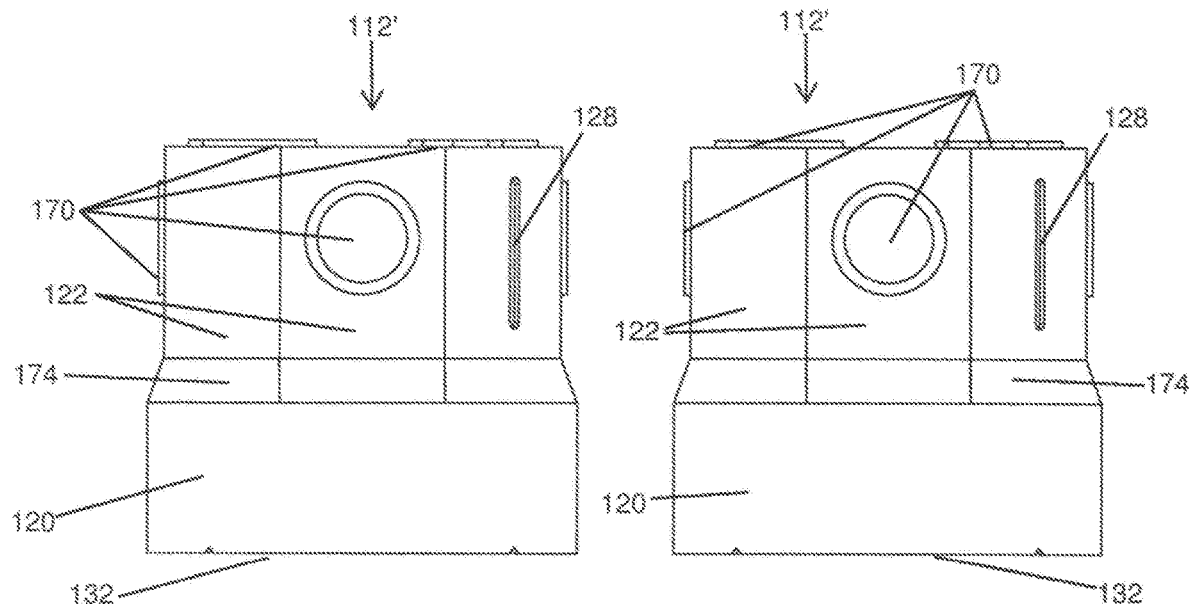
FIG. 13 shows a front view of the box of FIG. 9.
FIG. 14 shows a rear view of the box of FIG. 9.
Figures 15, 16:
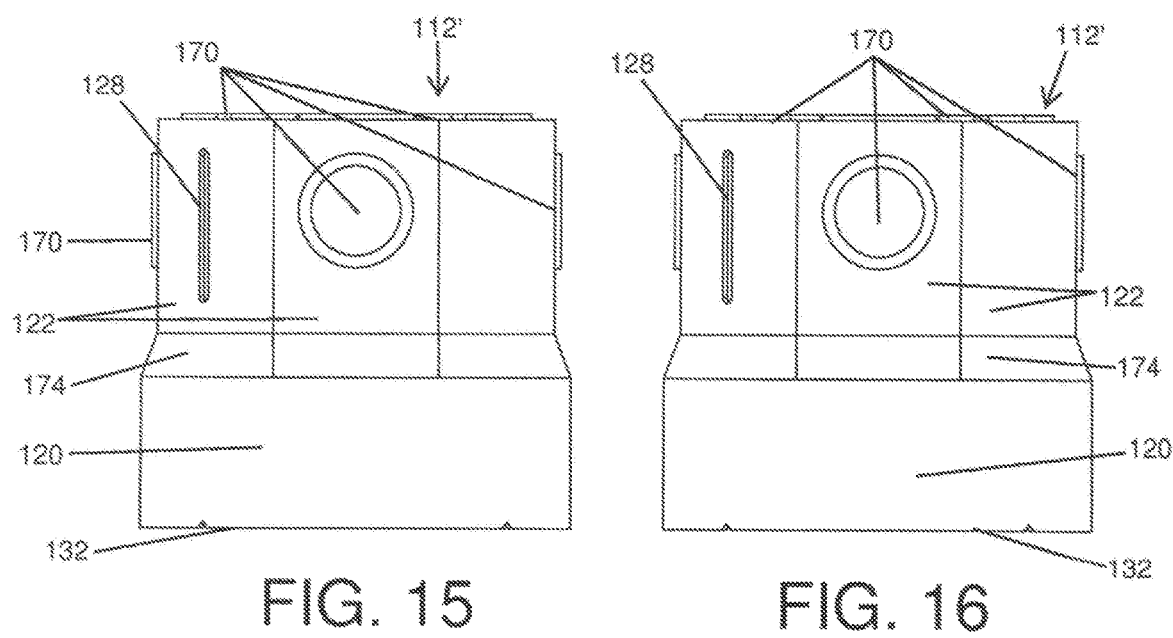
FIG. 15 shows a right side view of the box of FIG. 9.
FIG. 16 shows a left side view of the box of FIG. 9.

The present invention is in the realization that a circular open bottom of a junction lighting box can be accompanied by one or more flat inset facets for presenting one or more knock-outs and leaving a flat opening on removal of the one or more knock-outs for fitting a conventional conduit fitting thereby allowing through-branch wiring connections into the junction lighting box through the opening formed by removal of the knock-outs and installation of the conduit fitting. This is done by providing the junction lighting box in fully cylindrical form in a lower portion and an upper portion having the cylindrical form interrupted by one or more flat inset facets having the knock-out on the flat surface. In one embodiment, the upper portion is configured in pentagonal peripheral portions and in which alternate ones of the pentagonal peripheral portions the cylindrical shape is interrupted by the flat inset facets thereby giving four flat inset facets each separated by a cylindrical portion which extends as a continuation of the cylindrical form of the lower portion. In another embodiment, all eight of the octagonal peripheral portions are formed as flat inset facets (which may be referred to simply as facets) thereby allowing a knock-out in each one if desired, although the knock-outs could still be only in alternate ones of the facets. Another embodiment specifies that in the foregoing first embodiment at least a pair of the cylindrical upper portions which are on opposite sides of the junction lighting box each having a vertical slot for carrying a bracket and mounted on the bracket is a telescoping sliding rail as more fully described below. Yet a variation of that embodiment is applied to the embodiment having all of the octagonal peripheral portions being flat inset facets and having the pair of opposing vertical slots in opposing facets and similarly having a bracket for sliding and being fixed at a location on the slot length which is more fully described below. Yet a further embodiment is to have a hanger bar bracket assembly having a height slide plate fitted to the box, the height slide plate having a slot positioned to a hole in the box, such that the box can slide along the height slide plate and then be fixed at a selected height by a bolt through the slot and through the hole and tightened on the inside of the box. This then allows for adjustment of the box relative to a ceiling where the bracket assembly with brackets is fixed to joists and the box can be moved vertically to the right position by adjusting along the slot of the height slide plate. Thus, the height slide plate and bracket assembly are vertically fixed with respect to the ceiling joists, but still allow for height adjustment of the lighting junction box during installation.

Each of the embodiments of the present invention remedies the difficulty and time delay presented by the requirement for making an octagonal opening for the prior art combination junction box, and eliminates the need for a customized lighting element or fixture that fits the unique octagonal shape. A circular opening is much easier to cut into a surface, as it would not require extensive preparation or measurements taken during the cutting process, but instead only requires the use of a hand or press drill equipped with an appropriately-sized circular saw-bit. However, a fully cylindrical junction lighting box—with a circular cross-section to match the circular surface cutout—would not include properly-shaped knock-outs used for branch-through wiring.

FIGS. 1-8 show an embodiment of a cylindrical junction lighting box unit 112. The cylindrical junction lighting box unit 112 fits into a circular surface cutout 118 (FIG. 17), and includes a cylindrical body 120 that incorporates four flat inset facets 122 each into the cylindrical form providing a substantially flat surface on which to form knock-out holes 124. Each of the flat inset facets occupies an octagonal peripheral portion P/8 of the periphery of the body 120. These are shown as the periphery designated as P/8 meaning a ⅛th peripheral portion of the body 120. The flat inset facets 122 extend from the top of the cylindrical junction lighting box unit axially downward to a termination a selected distance from the top thereby defining a length dimension L of the flat inset facets. At their bottom, the flat inset facets end, in the illustrated embodiment by a transition from the flat inset surface to the curved outer diameter of the cylindrical body 120 at a sloped indentation 126, and are each adjacent to a curved segment 180. In the embodiment shown there are four such flat inset facets each occupying a P/8 peripheral portion and equally spaced apart by a peripheral portion P/8 around the body 120 so as to define eight octagonal peripheral spaces. Therefore, the junction lighting box is seen as being cylindrical from its circular open bottom to its closed top except that in an upper portion, there are defined octagonal peripheral portions around the periphery and the flat inset facets each occupying an octagonal peripheral portion P/8 alternate with extended cylindrical octagonal peripheral portions P/8 in the shape of the upper portion. A pair of bracket positioning slots 128 are cut into the cylindrical body 120 on directly opposing facets 122, which affords access to an interior cylindrical cavity 130 and allows mounting and positioning of brackets as described below. The cylindrical junction lighting box unit 112 terminates at one end in a circular notched edge 132, and in a closed top 178 at the other end. In an alternative embodiment, the body 120 includes a non-notched circular edge (not shown) that is, the notch is omitted. The box unit 112 is formed from cast aluminum, but may alternatively be formed from any other fire-rated durable polymer or metallic substance. In an alternative embodiment, the facets 122 do not extend from a midpoint on the cylindrical body 120 to the closed end 178, but are present surrounding the axial midpoint of the cylindrical body 120. Each such alternative middle face would incorporate an upper sloped indentation (not shown) in addition to the previously-described lower sloped indentation 126. The result of this alternative embodiment would be a junction lighting box unit (not shown) having both top and bottom circular cross-sections.

The embodiment shown in FIGS. 1-8 further incorporates blocked knock-out holes 170, and an external length gauge 172 that can be used to measure the depth at which the junction box unit 112 protrudes below the plane any attached optional mounting bracket assembly (not shown). FIG. 1A highlights the canted shape of the sloped indentation 126, in relation to the face 122 and cylindrical body 120, and the presence of a curved segment 180 adjacent to the face 122. From a view showing the cylindrical cavity 130 (see FIG. 2), the sloped indentations 126 and facets 122 project inwardly toward the center of the cavity 130. The external length gauge 172 is shown here as utilizing imperial units, with hash marks set at ½", ⅝", ¾", 1", and 1½" distances from the circular edge 132. As described above, the length gauge 172 is used to align the junction lighting box unit 112 with the outer surface of a circular cutout 118 (FIG. 17). Given the varying thicknesses of installation surfaces, and degrees to which the box unit 112 protrudes from the cutout 118 (FIG. 17), the length gauge 172 can be used as a guide to help immovably secure the box unit 112 to the mounting bracket assembly 152 (FIG. 19) at the correct position, without needing to approximate a set position or visually inspect the installation from both sides. In alternative embodiment, the gauge 172 is laid out in metric units. In a further alternative embodiment, the gauge 172 may employ any number of hash marks, extending axially along the cylindrical body 120 away from the notched circular edge 132. In another alternative embodiment, the junction box unit 112 does not include the pair of bracket positioning slots 128 or blocked knock-out holes 170.

FIGS. 9-16 show an alternative embodiment of a junction lighting box unit 112', which incorporates blocked knock-out holes 170, an upper portion with eight flat inset facets 122 each occupying the adjacent octagonal [peripheral portions P/8, a pair of bracket positioning slots 128 cut into a pair of non-adjacent directly-opposing facets 122, and a curved belt transition 174 joining the eight flat inset facets 122 with the lower cylindrical body 120. FIG. 9A highlights the angled conical frustum shape of the curved belt transition 174, which smoothly joins each facet 122 with the cylindrical body 120. In an alternative embodiment, the curved transition 174 is at least partially concave relative to the internal cavity 176. In another alternative embodiment, the curved transition 174 is at least partially convex relative to the internal cavity 176. FIG. 10 provides an angled perspective view of the internal cylindrical cavity 176, and the way the curved belt transition 174 and facets 122 project inwardly toward the center of the internal cavity 176. The inward projection into the cavity 176 results in the upper portion of the semi-cylindrical junction box unit 112" having a smaller average width than the diameter of the lower cylindrical body 120, thus allowing for easier insertion into a circular cutout 118 (FIG. 17). In this alternative embodiment, the pair of bracket positioning slots 128 are positioned on directly-opposing facets 122, which necessarily results in an attached pair of sliding box brackets (not shown) being adapted to slide along a flat inset surface. In another alternative embodiment, the junction lighting box unit 112' does not include bracket positioning slots 128 or blocked knock-out holes 170.

Therefore, as shown in FIGS. 1-16 and described above, the junction lighting box units 112 and 112' each include a cylindrical body 120 with a circular bottom edge 132 and closed top 178. Each includes at least one flat inset facet 122 extending from a closed top 178, which interrupts the cylindrical shape, and where the flat inset facet 122 extends downward from the closed top 178 and contains a conventional flat knock-out hole 124. The at least one flat inset facet 122 has a height down from the closed top 178 sufficient to accommodate the threaded branch-through connector 146 (FIG. 18) and electrical conduit 148 (FIG. 18). Thus, the junction lighting box unit 112 generally includes a periphery nearest the closed top 178 having the eight octagonal peripheral portions that may be occupied either by a flat inset facet 122 or a curved segment 180 of the body 120. In an embodiment where only a single flat inset facet 122 is present occupying a single octagonal peripheral portion P/8, the remaining seven octagonal peripheral portions P/8 would be a contiguous curved segments 180 that form the body 120. In the embodiments that include four flat inset facets 122 (FIGS. 3-14), each facet 122 is set adjacent to a curved segment 180 to total eight peripheral octagonal portions P/8. In the embodiment that includes eight flat inset facets 122 (FIGS. 9-16), all of the eight peripheral octagonal portions P/8 are formed as flat inset facets 122, thus providing an octagonal cross-section and octagonal closed top 178'.

As described above, each flat inset facet 122 must be tall enough to afford the use of knock-out holes 124 that allow for the clamping of electrical wiring in place. It is understood that a distance around the knock-out 124 of at least about ¼ inch is so required. For example, in the case of a junction lighting box unit 112 having about a four-inch total height, the height of each flat inset facet 122 should be in a range of from ⅓ to ½ the value of the total height of the body 120. These distances are approximations used to afford the clearance needed by each knock-out hole 124, threaded branch-through connector 146, and electrical conduit 148. If the diameter of the cylindrical body 120 is an exemplary 4⅛ inches, then each flat inset facet 122 and curved segment 180 will be about 1⅝ inches wide.

FIGS. 17 and 18 show an embodiment of the junction lighting box assembly 110 (having axis A) that includes an alternative semi-cylindrical junction lighting box unit 112", light emitter 114, and surface fixture 116. The light emitter 114 includes an emitter housing 134 and protective lens 136, while the surface fixture 116 includes a set of latches 138 that secure the light emitter 114 within the junction lighting box 110 by selectively grabbing onto the emitter housing 134 while simultaneously pressing outward on the interior surface of the cylindrical cavity 130 when fully assembled, an emitter opening 140, a curved conical reflector 142 used to direct emitted light away from the junction lighting box 110, and an annular surface lip 144 that hides the fitting of the circular cutout 118 and the cylindrical body 120 of the junction lighting box 110. The annular surface lip 144 may alternatively be omitted. In an alternative embodiment, the light emitter 114 may incorporate multiple emitter housings 134, each with at least one protective lens 136. In another embodiment, the surface fixture 116 may include a polygonal or elliptical emitter opening (not shown) and corresponding angular or curved reflector (not shown).

FIG. 18 also shows the insertion of a pair of threaded through-branch connectors 146 into two knock-out holes 124 formed on the facets 122 of the junction lighting box unit 112. The connectors 146 are each secured to electrical conduits 148 via a clamp screw 150, although the conduits 148 in this embodiment do not contain wiring (not shown). These connectors 146 and conduits 148 are typically formed from cast aluminum, but may alternatively be formed from any other durable and fire-rated polymer or metallic substance. Exemplary of the connectors 146 are conventional Flexible Metal Conduit (FMC) conduit fittings and Electrical Metal Tube (EMT) conduit fittings available from Eaton Corp. of Cleveland, Ohio.

Figure 19:
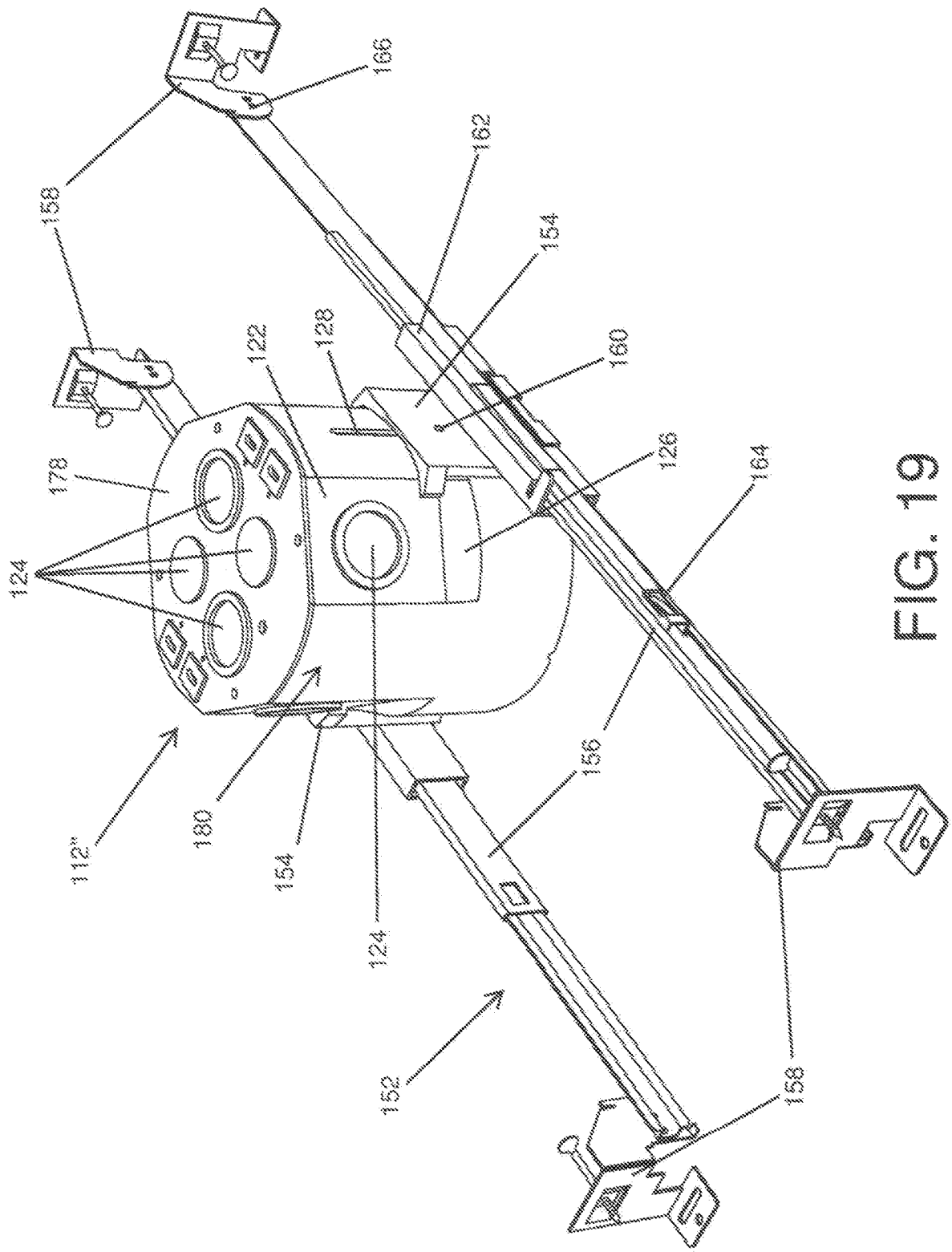
FIG. 19 shows a perspective view of a partially-faceted junction box and attached adjustable mounting assembly, according to one embodiment.

FIGS. 19 and 20 show the semi-cylindrical junction lighting box unit 112", attached to a mounting bracket assembly 152. The assembly 152 includes a pair of sliding box brackets 154 that mount to the pair of bracket positioning slots 128 found on the cylindrical body 130 of the box unit 112", and a pair of telescoping sliding rails 156 each terminating in two selectively-rotatable attachment brackets 158. The sliding box brackets 154 include a flat inset outwardly-facing side and a rounded box-facing side contoured to closely engage the pair of curved outer portions of the cylindrical body 120 that each include a bracket positioning slot 128. The curve of the inner surface of each sliding box bracket 154 ensures that the junction box unit 112" remains laterally and rotationally fixed, while a set screw 160—passing through each bracket 154 and into each slot 128—ensures that the unit 112 remains fixed at a single height. Loosening, but not removing the set screw 160, allows the junction lighting box unit 112 to slide along its height, while tightening the screw 160 locks the unit 112 at a set position. The position of the box unit 112, relative to the assembly 152 and/or circular ceiling cutout 118 may be determined by referring to an external length gauge 172 (FIGS. 1-8), printed on the body 120 of the unit 112. The pair of telescoping sliding rails 156 include a lateral c-bracket 162 that fixes the pair of telescoping rails 156 to the pair of sliding box brackets 154. Locking tabs 164 fix the length of each rail 156, while selectively-rotatable joints 166 join the rails 156 to the selectively-rotatable attachment brackets 158. Exemplary of the rails 156 are conventional Interlocking Adjustable Mounting Bars (Model #26UBH) available from Pathway Lighting Products, Inc., of Old Saybrook, Conn.

As seen specifically in FIG. 20, the selectively-rotatable attachment brackets 158 couple to support struts 168, such that a box unit 112 as described in FIGS. 1-8 can be suspended equidistantly between them. Alternatively, the mounting bracket assembly 152 may be used to securely fasten the junction lighting box unit 112" to support struts 168 in a variety of spacing and rotational configurations. The mounting bracket assembly 152 is constructed of a metallic material, but may alternatively be constructed from a durable polymer capable of supporting the weight of a complete junction lighting box 110. In the present embodiment, the junction lighting box unit 112" acts as a recessed housing with all electrical components and connections easily accessible via the removal of the light-emitter 114 and surface fixture 116. In an alternative embodiment, the junction lighting box unit 112" may be mounted to supporting brackets (not shown) that causes the unit 112" to protrude through the cutout 118 (FIG. 17) when fully installed.

To install the junction lighting box 110 (FIGS. 17-18) and mounting bracket assembly 152 (FIGS. 19-20), a user must first cut the circular hole 118 in a desired surface, and then insert the junction lighting box unit 112" through the circular hole 118. Next, the junction lighting box unit 112" must be attached to the mounting assembly 152, and the mounting assembly 152 connected to a fixed anchoring point, which may or may not include surface around the circular hole 118 or a separate support strut 168. The user must then set the mounting depth of the junction lighting box unit 112", fixing its position relative to the mounting assembly 152, and finally install the light emitter 114 and surface fixture 116 within the set junction lighting box unit 112".

Further embodiments with several component variations are shown in FIGS. 21-62. These will be now described with some new terminology for parts and functions and numbering of the parts notwithstanding some commonality to the descriptions above, in order to make clear the differences. These embodiments provide for the movement of the junction lighting box 201 (also referred to as the box) to be adjusted to the necessary position relative to the ceiling opening. As will be understood from the detail below, a feature of these embodiments is to reverse the slot and hole arrangement as described above by having a slot in a hanger bar bracket assembly 213 mated to a bolt passage hole 203 in the box 201.

Typically the required final adjustment of the position of the junction lighting box 201 is made after installation of the hanger bars 231 to adjacent ceiling joists 243. In the alternative embodiments, design features are utilized which allow the vertical position of the junction lighting box 201 to be adjusted and it is then fixed in place from inside of the box 201.

Referring to FIGS. 21-44 now will be described a basic alternative embodiment. In this embodiment a carriage bolt 251 is utilized to secure the hanger bar bracket assembly 213 to the box 201. The general description of this embodiment is that a hanger bar bracket assembly 213 has a height slide plate 219 which has a bracket positioning slot 217 and which is located aligned with a bolt passage hole 203 in the box 201. Then a bolt 224 is passed through the height slide plate 219, through the bolt passage hole 203 and having its threaded end inside the box 201. Then when the desired relative position is attained the bolt 224 is tightened from inside the box 201, using a selected thread tightening means. The selected thread tightening means is a wing nut 227 along with a lock washer 229 such as a star type lock-washer. This variation uses a bolt 224 with a portion on its shank that resides in the groove and therefore the carriage bolt not allowed to rotate while it is being tightened. The term carriage bolt refers to a type of bolt that has structure on its shank so as to resist turning, Exemplary of such a carriage bolt is National Hardware N 280-850 V7652 Flat Head Carriage Bolt.

FIG. 21 and FIG. 22 show top perspective and bottom perspective views of this alternative embodiment of the junction lighting box 201 showing the bolt passage holes 203 on opposite sides in portions 204 of the box 201 that retain the circular shape. FIG. 23 and FIG. 24 show the front and back views of the junction lighting box 201. FIG. 25 and FIG. 26 show the right side and left side views of the junction lighting box 201, which also show in the circular portions 204 the new bolt passage holes 203 through which the carriage bolt 251 passes for mounting the hanger bar bracket assembly to the box 201.

FIG. 27 shows an exploded top perspective view of the alternative embodiment of the junction lighting box 201, with the lid 205 shown separated from the junction lighting box housing portion 211. In this embodiment, certain of the pryout pieces have been removed. Shown in this view, are lid rivet holes 207 and box housing rivet holes 209. The rivet holes 209 on the junction lighting box housing portion 211 are located on tab portions 210 of the junction lighting box housing portion 211. FIG. 28 and FIG. 29 show a top view of this embodiment version of the lid 205 rotated 90 degrees. Rivet holes 207 are shown in both views. This version of the junction lighting box housing portion 211 allows adjustment of the vertical position of the box 201 from the top of the junction lighting box housing portion 211 by removal of the lid 205. Otherwise the adjustment takes place from the open bottom of the junction lighting box housing portion 211.

FIGS. 30-44 show various views of the alternative embodiment hanger bar bracket assembly 213. Various details of the hanger bar bracket assembly 213 may be seen in these views. The hanger bar holder rail 215 in this embodiment includes a threaded screw hole 223A to secure the hanger bar 231 (seen in later views) in place on each side of the junction lighting box housing portion 211. The threaded screw hole 223A can be seen in FIGS. 30, 31 and 33. The hanger bar holder rail 215 is attached to the height slide plate 219, as below described. The height slide plate 219 has a front surface 219F and a back surface 219B. The back surface 219B is curved to be congruent with the shape of the circular portion 204 of the junction lighting box housing portion 211, that mated shape will keep the junction lighting box housing portion 211 and the hanger bar bracket assembly 213 in proper alignment. The height slide plate 219 has a bracket positioning slot 217 which allows for a bolt of the type that will not be allowed to rotate when in position. In this embodiment the bolt 224 is a carriage bolt which passes through the bracket positioning slot 217 and is fixed from rotation by the slot engaging its square-shank portion 225 and then passing through the bolt passage hole 203 of the junction lighting box housing portion 211, with its threads then inside the junction lighting box housing portion 211 to receive a nut such as wing nut 227, fitted with lock washer 229. This then allows fixing of the hanger bar bracket assembly 213 to the junction lighting box housing portion 211 after adjusting the vertical position of the lighting junction box 201 by sliding it vertically. The bracket positioning slot 217 then, allows for a range of motion of the junction lighting box housing portion 211 and the whole junction lighting box 201 as required for setting its position for varying ceiling thicknesses. The bracket positioning slot 217 can be seen in FIGS. 30-35. The bracket positioning slot configuration in this embodiment, with the bracket positioning slot 217 sliding along a square-shank section 225 of the bolt 224 during installation, allows for the bolt 224 to be tightened from the inside of the junction lighting box housing portion 211. That allows for the tightening to be done from the bottom or from the top of the junction lighting box housing portion 211 after which the lid 205 is typically installed, although in many cases the lid 205 will have been removed and the tightening can be done only from the bottom. When the junction lighting box housing portion 211 has the lid 205 attached it becomes referred to as the junction lighting box 201. Also in this embodiment, as also shown in FIG. 34 washers 228 are utilized to create clearance between the height slide plate 219 and hanger bar holder rail 215 for the head of the bolt 224 to pass in the bracket positioning slot 217 under hangar bar holder rail 215.

Figure 34:
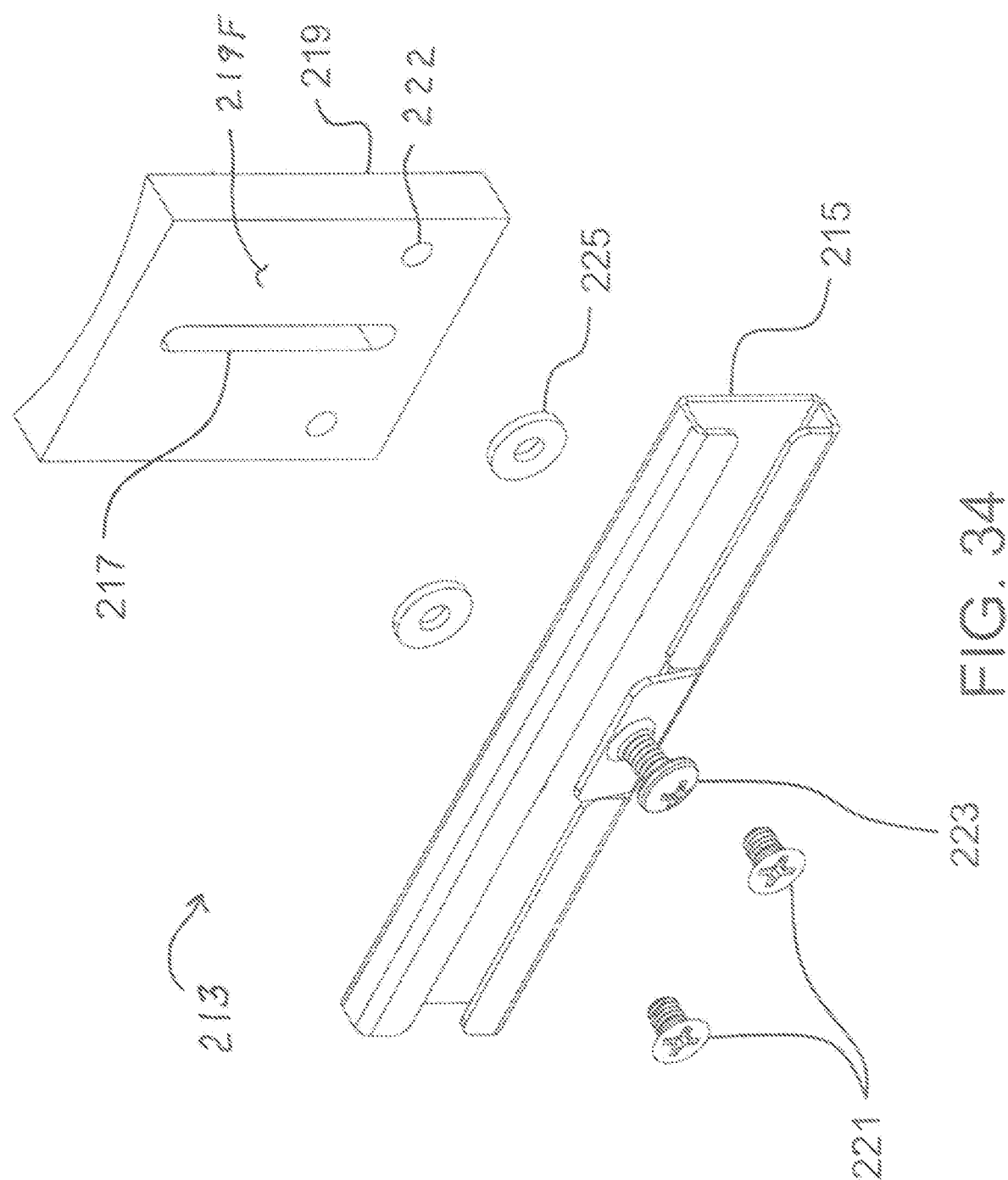
FIG. 34 shows an exploded front perspective view of the hanger bar bracket assembly according to the alternative embodiment.

FIG. 34 is an exploded view of the hanger bar bracket assembly 213 showing various details of this embodiment. Shown are the rail holder threaded screws 221 in the form of threaded screws (also seen in FIGS. 30 and 33) which are utilized to affix the hanger bar holder rail 215 to the height slide plate 219 by threaded holes 222 in the height slide plate 219. Washers 228 between the hanger bar holder rail 215 and the height slide plate 219 are utilized to create enough clearance for the head of the bolt 224 to pass under the hanger bar bracket assembly 213. The hanger bar holder rail 215 incorporates a threaded screw hole 223A (FIGS. 30, 31, 33,34, 35, 36 and 37) in which the hanger bar securing screw 223 (FIGS. 34, 35 and 36) is used to secure the hanger bar (not shown) in the necessary laterally extending installation position to mount to joists between which the junction lighting box 201 is to be installed.

FIG. 35 and FIG. 36 show the above described junction lighting box 201 from top and bottom perspective views, with the hanger bar bracket assembly 213 shown mounted to the junction lighting box 201.

FIG. 37 shows an exploded view of the alternate embodiment junction lighting box assembly 200, as shown comprising the junction lighting box 201 and attached to the junction lighting box 201 is the hanger bar bracket assembly 213. Various components shown include the lid 205 and junction lighting box housing portion 211 which together define the junction lighting box 201. Shown on the lid 205 is a ground screw 212 which is used for electrical grounding connections. The hanger bar bracket assembly 213, which as shown assembled includes the hanger bar holder rail 215, and the height slide plate 219 which are fastened together by fasteners. The hanger bar bracket assembly 213 affixes the hanger bar holder rail 215 to the junction lighting box 201 using the bolt 224 fitted in the bracket positioning slot 217 that extends through the height slide plate 219. The hanger bar securing screw 223 holds the hanger bar 231 (not shown) in place laterally and prevents the junction lighting box 201 from sliding laterally along the hanger bar 231. As described above the hanger bar holding rail is fastened to the height slide plate 219 by rail holder threaded screws 221. In this embodiment, the bolt 224 has a square-shank portion 225 on its shank 226, which allows junction lighting box 201 to be positioned in varying vertical positions by sliding it against the height slide plate 219 while fixing the square-shank portion 225 of the bolt 224 in the bracket positioning slot 217 to prevent rotation, and which allow the desired vertical position of the junction lighting box 201 to be fixed during installation. The bolt 224 is secured in this embodiment from the inside of the junction lighting box housing portion 211 with a wingnut 227 and star lock washer 229 which keeps the junction lighting box 201 in the set position relative to a ceiling opening.

Figure 39:
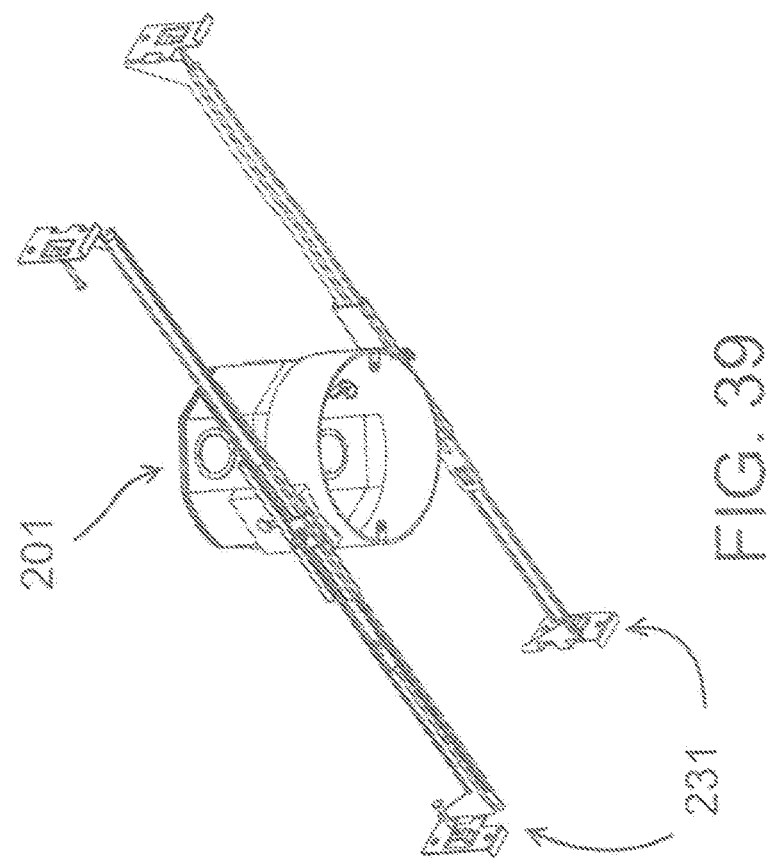
FIG. 39 shows a bottom perspective view of the box and lid assembly from FIG. 21 with a pair of attached hanger bar bracket assemblies from FIG. 30 connected to a pair of hanger bars.
Figure 38:
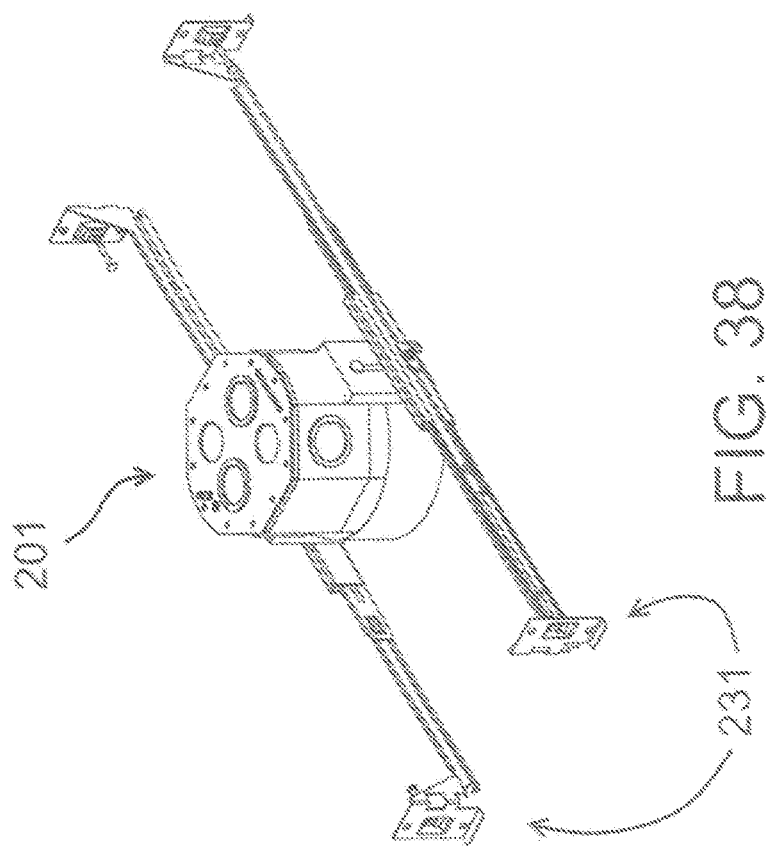
FIG. 38 shows a top perspective view of the box and lid assembly from FIG. 21 with a pair of attached hanger bar bracket assemblies from FIG. 30 connected to a pair of hanger bars.

FIG. 38 and FIG. 39 show the junction lighting box 201 held in position between a pair of hanger bars 231. FIG. 38 shows a top perspective view of the assembly with the hanger bars 231 and FIG. 39 shows a bottom perspective view of the same assembly embodiment.

Figure 40:
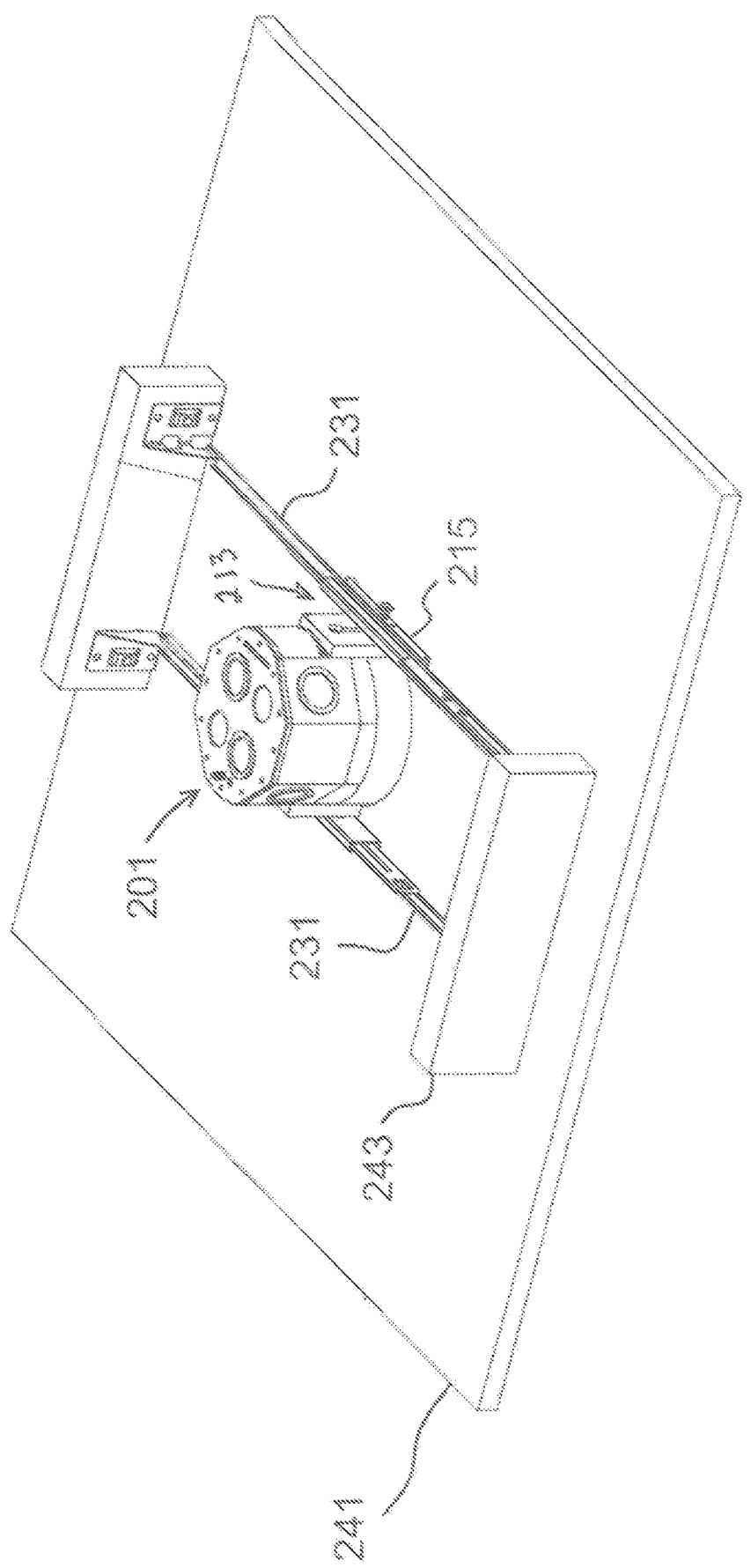
FIG. 40 shows a top perspective view of the box and lid assembly from FIG. 21 with a pair of attached hanger bar bracket assemblies from FIG. 30 connected to a pair of hanger bars mounted between ceiling joists.

FIG. 40 show a top perspective view of this alternate embodiment junction lighting box 201, mounted by the hanger bar bracket assemblies 213 including the hanger bar holder rail 215, between hanger bars 231 which themselves are fixed between adjacent ceiling joists 243 above the ceiling 241.

FIGS. 41 and 42 show a side and cross-section view of the installed alternative embodiment junction lighting box assembly 200. The side view FIG. 41 and cross-section view FIG. 42 show the hanger bar 231 between ceiling joists 243 installed in the recessed ceiling 241A of minimum thickness.

Figure 43:
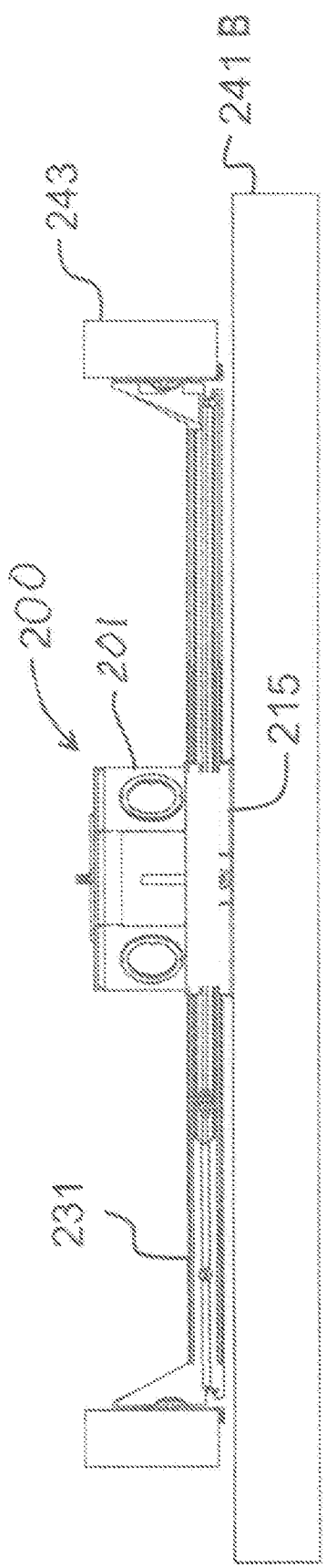
FIG. 43 shows a side view of the box and lid assembly from FIG. 21 with a pair of attached hanger bar bracket assemblies from FIG. 30 connected to a pair of hanger bars mounted between ceiling joists, with the box configured for maximum ceiling thickness.
Figure 44:
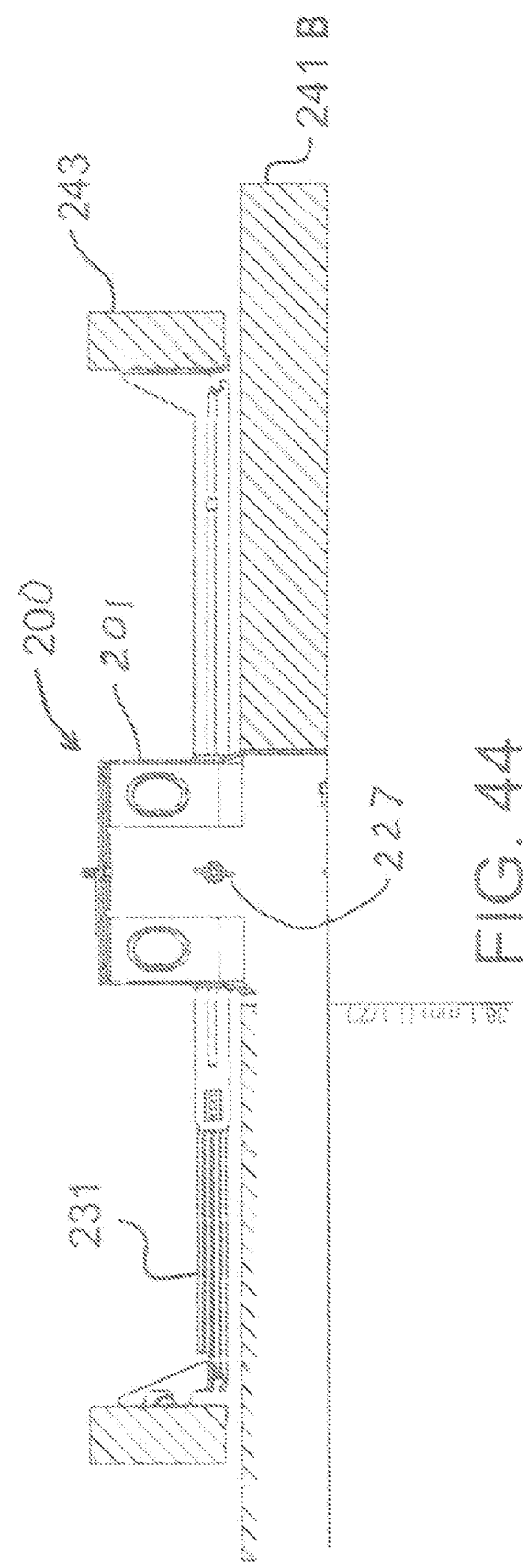
FIG. 44 shows a side cross-section view of the box and lid assembly from FIG. 21 with a pair of attached hanger bar bracket assemblies from FIG. 30 connected to a pair of hanger bars mounted between ceiling joists, with the box configured for maximum ceiling thickness.

FIGS. 43 and 44 show a side and cross-section view of the installed alternative embodiment junction lighting box assembly 200. The side view FIG. 43 and cross-section view FIG. 44 show the hanger bar 231 between ceiling joists 243 installed in the recessed ceiling 241B of maximum thickness. In sectional view of FIG. 44 the wing nut can be seen inside the junction lighting box 201.

FIGS. 45 through 56 show another variation of the alternative embodiment. As will be further described in detail, a feature of this variation is that the hanger bar holder rail is fastened directly to the height slide plate 219 without the space as needed for a bolt head in the variation described above. That feature is enabled by incorporating a groove 254 above the slot 257 the groove 254 opening to the front surface 219F of the height slide bracket 253 and using a bolt 250/250A that has a bolt head 251/251A having flat parallel opposite sides to fit into the groove 254, which similarly to the use of the carriage bolt 224, prevents any rotation of the bolt 250/250A. The version of this bolt as 250 is a custom made bolt having a bolt head 251 having a single set or pair of flat parallel opposite sides 252. The version of the bolt shown as 250A is a standard hex head bolt having three sets or pairs of flat parallel opposite sides 251A. In use each of the bolts 250 and 251 are installed with the bolt head 251 and 251A inside the groove that is, flush with or below the front surface which then allows full traverse of the slot 257 without the need to space the hanger bolt holder rail 215 away from the height slide bracket 253. This is combined slot 257 and groove 254 forms what is commonly called a T-slot and the bolt 250 is commonly called a T-Slot Bolt. A commercial example of a T-Slot Bolt is the Gibraltar series from MSC Industrial Supply Co., of Davidson, N.C. USA.

FIG. 46 show top perspective views of the lighting junction box and hanger bar bracket assembly in rotated positions to show various details of the design. Shown are the junction box lighting 201 with the height slide plate 219 and hanger bar holder rail 215 mounted on the junction lighting box 201.

FIG. 47 and FIG. 48 show another embodiment of hanger bar bracket assembly. In this embodiment, the height slide plate 253 has a slot 257 combined with an inset groove 254. In this embodiment the bolt head is fitted into the groove and the shank extends through the slot and the head has opposite parallel flat sides that are adjacent to the opposite walls of the groove, whereby the bolt is restrained from rotation similarly to that described above, but in this embodiment the, bolt head is below the front surface 253F of the height slide plate 253. In that sense the bolt performs as a carriage bolt 251 (shown in FIGS. 51 and 52) has opposite parallel flat sides 256 on the bolt head, which fits within a groove 254 in the height slide plate 253, so that the hanger bar holder rail 215 may be mounted flush against the grooved height slide plate without the washers needed in the previous embodiment (FIGS. 21-46). That is the head of the bolt is inside the groove 254 and the head of the bolt is configured with flat parallel opposite sides 256 that fit into the groove 254 thereby not allowing the bolt to rotate. As will be seen, a bolt 251 has the flat sides 252. However the groove 254 can have a width to accept the head of a standard hex head bolt such as carriage bolt 251A having the same useful application with random choice of three sets of flat parallel opposite sides 252A of the standard hex head bolt (which for convenience also falls within the definition as an "effective carriage bolt" because it provides the same resistance to turning). Again as noted above this combination can fit the configuration known as a T-Slot and a T-Slot Bolt.

Figure 50:
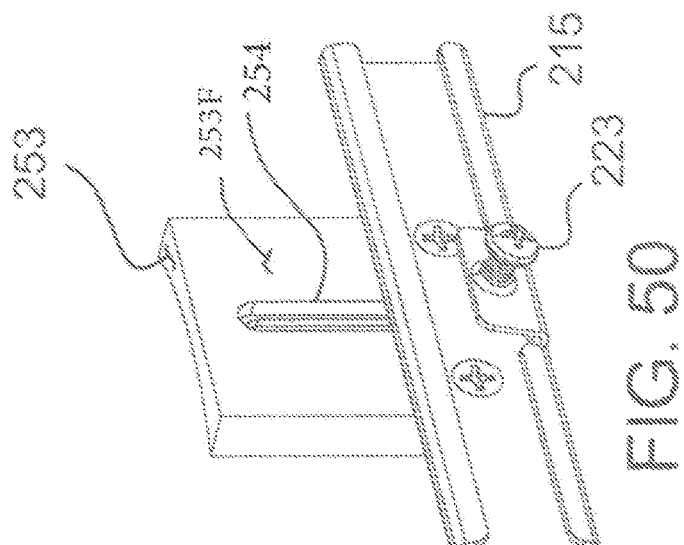
FIG. 50 shows a front perspective view of the hanger bar bracket assembly from FIG. 47 also showing the height slide plate with the slot and groove embodiment.
Figure 49:
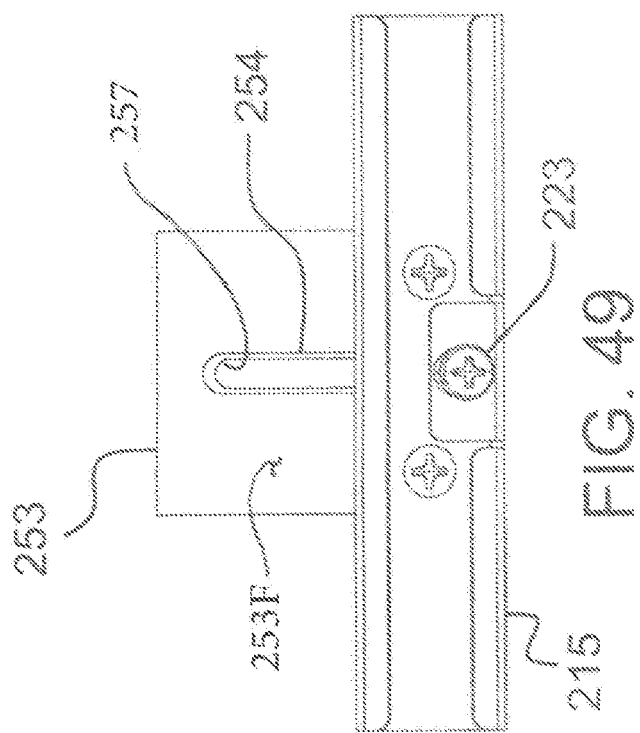
FIG. 49 shows a front view of the hanger bar bracket assembly from FIG. 47 also showing the height slide plate with the slot and groove embodiment.

FIG. 49 and FIG. 50 show the alternative embodiment hanger bracket assembly in front and rear perspective views. In this embodiment, the hanger bar holder rail 215 and hanger bar securing screw 223 are unchanged, but the height slide plate 253 incorporates the groove 254 which matches the width of the alternate embodiment carriage bolt 251 and 251A. The groove 254 in the height slide plate 253 has the advantage of eliminating the need for the spacer washers behind the hanger bar rail holder. The head of the carriage bolt 251/251A sits in the groove and is flush with or below the surface 253F of the height slide plate 253, so that it can move freely vertically to position the junction lighting box for various ceiling thicknesses as in the method described above.

Figures 52, 52A:
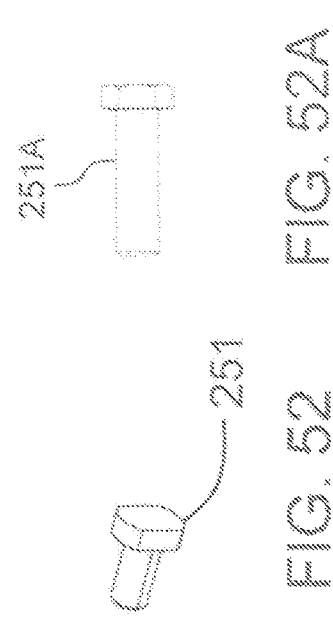
FIGS. 51 and 52 show an alternative embodiment of the bolt configured to hide the bolt head in the slot of the groove and slot embodiment.
FIGS. 51A and 52A show a standard commercial hex head bolt that can be used in the slot and groove embodiment.
Figures 51, 51A:
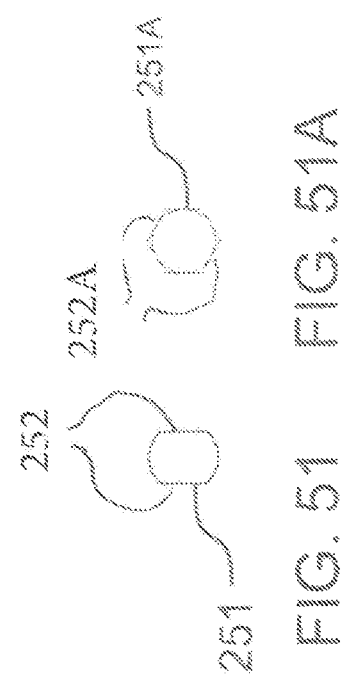
Figure 57:
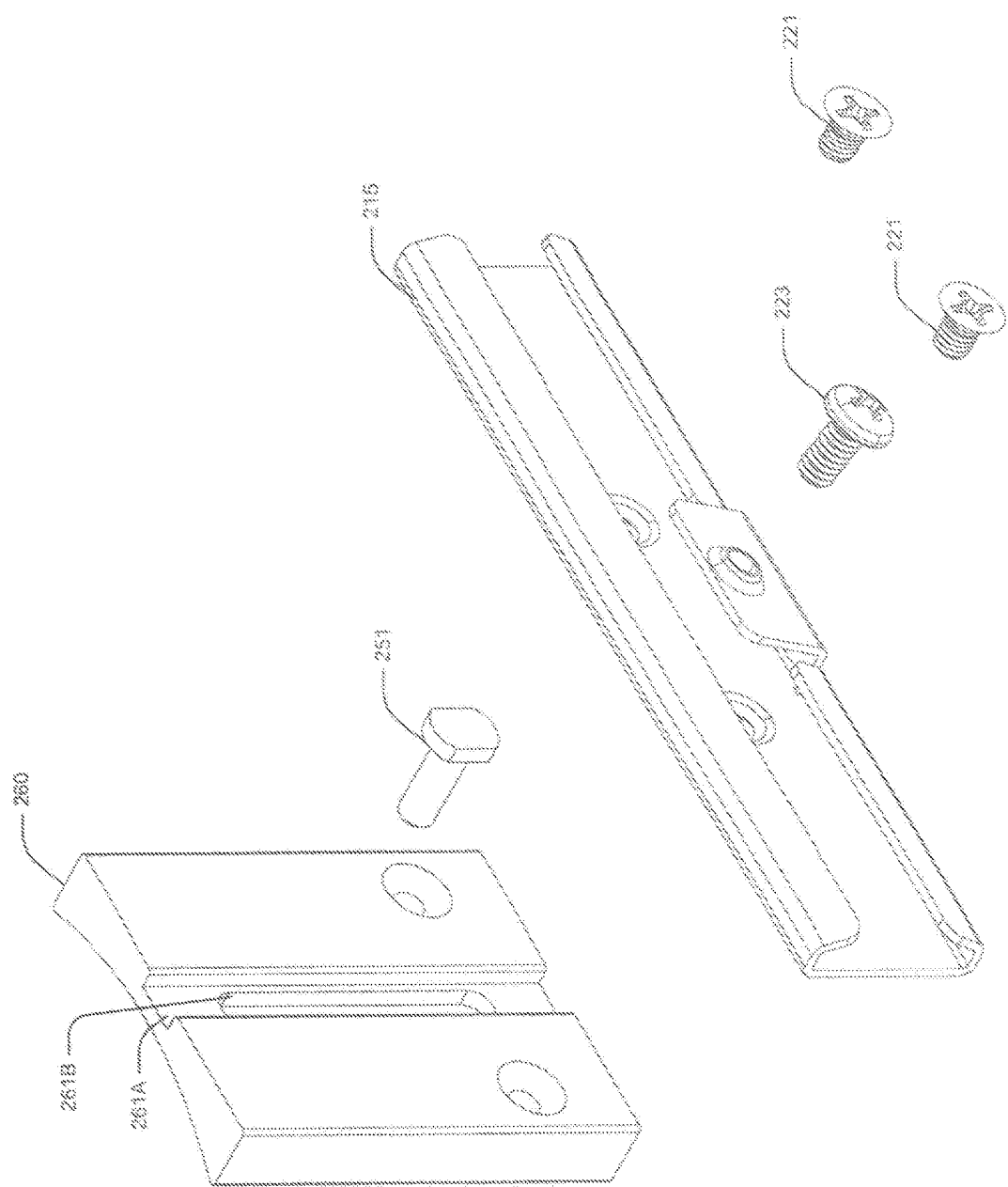
FIG. 57 shows a front exploded perspective view of an alternative embodiment hanger bar assembly.

FIG. 51 and FIG. 52 show front and side perspective views of the alternate embodiment carriage style bolt 251 with flat head sides 252. The shape of the carriage style bolt head has been modified to match the profile of the groove for a smooth vertical adjustment of the junction lighting box into its final position. The flat head sides 252 restrict this carriage bolt 251 from turning/rotating in place, allowing the bolt to be tightened with the wing nut 255 from the inside of the junction lighting box 201. This prevents it from rotating along with the wing nut.

FIG. 51A and FIG. 52A show front and side views of the alternate embodiment of the carriage bolt 251A with a standard commercial hex head. The hex head size of the effective carriage bolt is chosen to match the profile of the groove for a smoother movement. The flat sides of the hex head restrict the effective carriage bolt from turning/rotating in place, allowing the bolt to be tightened with the wing nut from the inside of the junction lighting box 201 as in the embodiment shown in FIG. 51 and FIG. 52. The term carriage style bolt is used to identify the functional purpose of the component in the assembly, even though this embodiment bolt is simply a standard threaded commercial bolt which is effectively acting as would a carriage bolt.

FIG. 53, 53A and FIG. 54 show side view, cross section A-A and back view of the alternate embodiment hanger bar bracket assembly, featuring the height slide plate 253 with the slot 257 and the inset groove 254, and the hanger bar holding rail 215 mounted flush against the height slide plate 253. FIG. 54 shows a view from the inside surface of the height slide plate 253. As noted above this is also defined as a T-Slot (254 and 257 together) and using a T-Slot Bolt (251 and 251A).

FIG. 55 shows a cross section view B-B from FIG. 56 of the junction lighting box assembly 201. From the bottom view FIG. 56, it is apparent that the height slide plate 253 is flush with the junction lighting box housing portion 211. The wing nut 255 for tightening the carriage bolt 251 can be seen in FIGS. 55 and 56. The wing nuts on each side allow the user to adjust the height of the junction lighting box assembly for a range of varying ceiling thicknesses from for example 0.5" to 1.5" in a typical embodiment.

Figure 59:
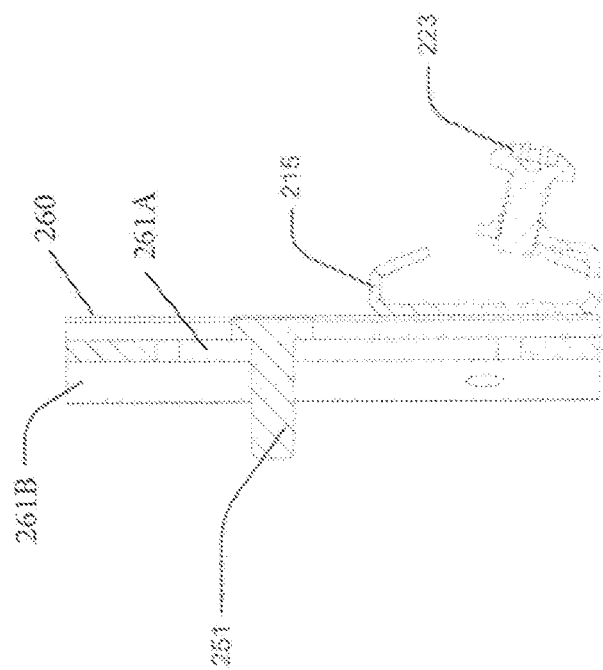
Figure 58:
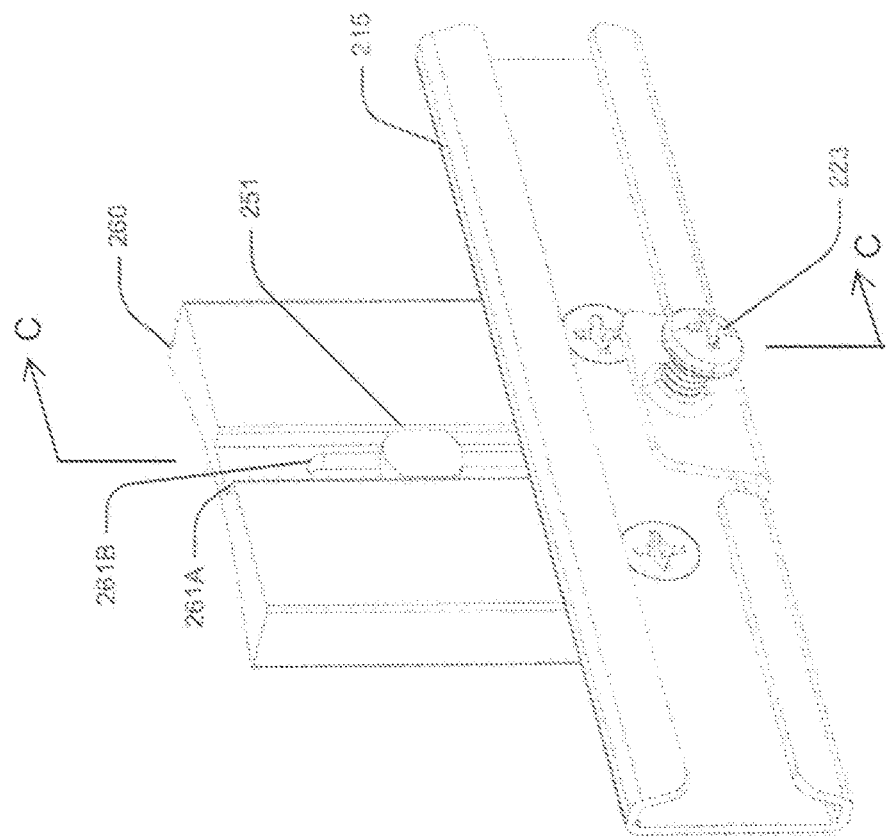
FIG. 58 shows a front perspective view of the alternative embodiment hanger bar assembly showing the height slide plate with the slot and groove embodiment FIG. 59 Section C-C is a cross section view through C-C of FIG. 58, of the alternative embodiment hanger bar assembly showing the height slide plate with the slot and groove embodiment

A component variation of this embodiment is shown in FIGS. 57-62 with a modified version of the modified grooved height slide plate 260 with full height extending groove 261A and bracket positioning slot 261B. In this variant of the previous embodiment, the full height extending groove 261A is milled across the full height dimension of the modified grooved height slide plate 260 to simplify aspects of the manufacturing process. It also provides alternative manufacturing configurations for setting the length of the bracket positioning slot 261B with a single tooling action. In other words, the modified grooved height slide plates 260 with the full height extending groove 261A may be configured with various lengths of bracket positioning slots 261B from a single inventoried grooved height slide plate template. This component variation is shown in the exploded view FIG. 57 and as fully assembled in FIG. 58. The other assembly components are unchanged from the previously described embodiment, include the carriage bolt 251 (which can also be a conventional hex head bolt), hangar bar holding rail 215, rail holder threaded screws 221 and hanger bar securing screw 223. FIG. 59 Section C-C shows a cross-section view C-C of FIG. 58 of the hanger bar bracket assembly, with assembled positions of the bolt 251, modified grooved height slide plate 260, hanger bar holder rail 215 and hanger bar securing screw 223. This can also be defined in the T-Slot (261A-261B) and T-Slot Bolt (261) configuration. FIG. 59 Section C-C shows the T-slot sectional shape formed by the slot 261B and the groove 261A defining a T-Slot.

FIG. 60 shows a top view of the modified grooved height slide plate 260 and modified groove 261A extending the full height of the plate 260 of the slot and groove (or T-slot). FIG. 61 shows a perspective view of the modified grooved height slide plate 260 with the full height extending groove 261A and bracket positioning slot 261B. Shown in FIG. 62 is a transparent view of the hanger bar bracket assembly with both modified slot 261B and groove 261A of height slide plate 260 and hanger bar holder rail 215 fixed and assembled.

Although particular embodiments of the invention have been described and illustrated herein, it is recognized that modifications and variations may readily occur to those skilled in the art, and consequently, it is intended that the claims be interpreted to cover such modifications and equivalents

The invention claimed is:
1. A junction lighting box assembly comprising:
   a junction lighting box comprising:
      a box housing portion defining a nominally cylindrical sidewall the nominally cylindrical sidewall having a lower portion of continuous cylindrical shape terminating as a peripherally circular opening at a bottom end, the sidewall having oppositely located continued cylindrically shaped wall portions extending to a top end and having a pair of bolt passage holes oppositely located in the oppositely located continued cylindrically shaped wall portions;
   a pair of hanger bar bracket assemblies each comprising:
      a height slide plate having a thickness defined by an inner surface and an outer surface and having a bracket positioning slot through the thickness and the bracket positioning slot having a vertical length and the inner surface having a curvature mated in vertical sliding contact to a curvature of the cylindrically shaped wall portion of the junction lighting box whereby the junction lighting box can slide vertically relative to the height slide plate but wherein rotation of the hanger bar bracket assembly is resisted by the mated curvature during a vertical positioning movement and at a position fixing;
      wherein the height slide plate is mated to the cylindrically shaped wall portion such that the bracket positioning slot is located for and has a length defining a vertical relative movement range as being open to the bolt passage hole;
      a hanger bar holding rail fixed to the outer surface of the height slide plate by one or more fasteners; and
      a bolt wherein the bolt extends through the bracket positioning slot of the height slide plate and through the bolt passage hole and the bolt having threads extending inside the junction lighting box and a nut on a threaded portion of the bolt inside the junction lighting box;
      wherein the junction lighting box may slide vertically relative to the height slide plate, the junction lighting box being retained and limited by the bolt, to a selected position of the vertical length of the bracket positioning slot when the nut is tightened.

2. The junction lighting box assembly of claim 1 wherein the bolt has a portion with flat sides adjacent to opposite sides of the bracket positioning slot such that the bolt is not allowed to rotate.

3. The junction lighting box assembly of claim 2 wherein the bolt has a head in contact with the outer surface of the height slide plate and a shank that extends through the bracket positioning slot and the portion with flat sides being on a portion of the shank that is within the bracket positioning slot whereby the bolt is not allowed to rotate.

4. The junction lighting box assembly of claim 1, wherein the junction lighting box has a periphery defining eight octagonal peripheral portions.

5. The junction lighting box assembly of claim 1, wherein the bolt comprises a square shank which is restricted from rotating when positioned in the bracket positioning slot.

6. The junction lighting box assembly of claim 1, wherein the bolt is a carriage bolt.

7. The junction lighting box assembly of claim 1, wherein the bracket positioning slot further comprises a bracket positioning slot groove for accepting a head of the bolt.

8. The junction lighting box assembly of claim 7, wherein the bolt comprises a head with at least two flat parallel opposite sides which are sized to fit in the bracket positioning slot groove thereby restricting rotation of the bolt with respect to the bracket positioning slot groove.

9. The junction lighting box assembly of claim 8, wherein the bolt head is a standard commercial hex head bolt, the hex head of which is sized to fit in the bracket positioning slot groove restricting rotation of the bolt with respect to the bracket positioning slot groove.

10. The junction lighting box assembly of claim 8 wherein a top of the head of the bolt is flush with or below an outer surface of the height slide plate.

11. The junction lighting box assembly of claim 1 wherein the nut is a wing nut.

12. The junction lighting box assembly of claim 1, wherein the junction lighting box housing is fire-rated.

13. A method for installing a junction lighting box assembly comprising:
    affixing a pair of hanger bars between ceiling joists;
    sliding the junction lighting box assembly between the hanger bars to a pre-determined position,
        wherein the junction lighting box assembly comprises a pair of hanger bar bracket assemblies and a junction lighting box,
        wherein the junction lighting box is vertically positionable on the pair of hanger bar bracket assemblies;
        wherein the pair of hanger bar bracket assemblies are vertically fixable on the junction lighting box by a corresponding pair of bolts, wherein a portion of each of the bolts is accessible from the inside of the junction lighting box housing;
    fixing the lateral position of the junction lighting box assembly utilizing a pair of rail fasteners;
    adjusting the vertical position of the junction lighting box to a position wherein a lower edge of the junction lighting box is flush with the lower surface of a ceiling structure;
    fixing the vertical position of the junction lighting box assembly by securing the pair of bolts.

14. The method of claim 13 wherein each hanger bracket assembly comprises a height slide plate and a hanger bar holding rail, and wherein the junction lighting box may slide vertically relative to the height slide plates, the junction lighting housing being retained and limited by the bolt to the vertical relative movement in a bracket positioning slot.

15. The method of claim 14 wherein the bolt has a portion with flat edges adjacent to opposite sides of the bracket positioning slot such that the bolt is not allowed to rotate.

16. The method of claim 15 wherein the bolt has a head in contact with the outer surface of the height slide plate and a shank that extends through the bracket positioning slot and the portion with flat edges being on a portion of the shank that is within the bracket positioning slot whereby the bolt is not allowed to rotate.

17. The method of claim 15, wherein the bolt is a carriage bolt.

18. The method of claim 14, wherein the bolt may be selectably fixed vertically in the bracket positioning slot by a nut screwed onto a threaded portion of the bolt from an inside portion of the junction lighting box housing.

19. The method of claim 14, wherein the bracket positioning slot further comprises a bracket positioning slot groove for accepting a head of the bolt and the head of the bolt comprises at least one set of flat parallel opposite sides spaced apart to fit adjacent sides of the groove wherein the parallel flat edges restrict the bolt from rotating within the bracket positioning slot groove.

20. The method of claim 19 wherein the head of the bolt may be selectably fixed vertically in the bracket positioning slot by a nut screwed onto a threaded portion of the carriage bolt from an inside portion of the junction lighting box housing.

* * * * *